(12) United States Patent
Gundavelli et al.

(10) Patent No.: US 11,743,798 B2
(45) Date of Patent: Aug. 29, 2023

(54) USER EQUIPMENT STEERING ACROSS A WIRELESS WIDE AREA DISAGGREGATED VIRTUALIZED RADIO ACCESS NETWORK AND A WIRELESS LOCAL AREA RADIO ACCESS NETWORK

(71) Applicant: Cisco Technology, Inc., San Jose, CA (US)

(72) Inventors: Srinath Gundavelli, San Jose, CA (US); Indermeet Singh Gandhi, San Jose, CA (US); Mark Grayson, Maidenhead (GB)

(73) Assignee: CISCO TECHNOLOGY, INC., San Jose, CA (US)

(*) Notice: Subject to any disclaimer, the term of this patent is extended or adjusted under 35 U.S.C. 154(b) by 101 days.

(21) Appl. No.: 17/399,286

(22) Filed: Aug. 11, 2021

(65) Prior Publication Data

US 2023/0047867 A1 Feb. 16, 2023

(51) Int. Cl.
*H04W 36/30* (2009.01)
*H04W 36/00* (2009.01)
*H04W 84/12* (2009.01)

(52) U.S. Cl.
CPC ....... *H04W 36/30* (2013.01); *H04W 36/0085* (2018.08); *H04W 84/12* (2013.01)

(58) Field of Classification Search
CPC .. H04W 36/30; H04W 84/12; H04W 36/0085
(Continued)

(56) References Cited

U.S. PATENT DOCUMENTS 10,244,422 B2   3/2019   Parulkar
10,506,492 B2   12/2019  Patil et al.
(Continued)

FOREIGN PATENT DOCUMENTS

| WO | 2018200570 A1 | 11/2018 |
| WO | 2020170087 A1 | 8/2020 |
| WO | 2020252377 A1 | 12/2020 |

OTHER PUBLICATIONS

3GPP, "3rd Generation Partnership Project; Technical Specification Group Radio Access Network; Evolved Universal Terrestrial Radio Access Network (E-UTRAN) and Wireless Local Area Network (WLAN); Xw application protocol (XwAP) (Release 16)", 3GPP TS 36.463 V16.0.0, Jul. 2020, 113 pages.

(Continued)

*Primary Examiner* — Dang T Ton
(74) *Attorney, Agent, or Firm* — Edell, Shapiro & Finnan, LLC

(57) ABSTRACT

Presented herein are techniques to facilitate wireless wide area (WWA) virtualized Radio Access Network (vRAN) (e.g., 5G) to wireless local area (WLA) RAN (e.g., Wi-Fi) steering or WLA RAN to WWA vRAN steering for one or more UE. In one example, a method may include obtaining first performance metrics associated with links of a WWA vRAN (e.g., fronthaul, midhaul, and backhaul links); obtaining second performance metrics associated with links WLA RAN (e.g., backhaul links); and in response to determining that one of the WWA vRAN is experiencing degraded performance based on the first performance metrics or the WLA RAN the second performance metrics, activating a steering event that causes, at least in part, an indication to be communicated to a UE to cause the UE to connect to the WWA vRAN or the WLA RAN that is not experiencing degraded performance.

20 Claims, 11 Drawing Sheets

(58) Field of Classification Search
USPC .................................. 370/329, 229, 395, 396
See application file for complete search history.

(56) References Cited

U.S. PATENT DOCUMENTS

| | | |
|---|---|---|
| 2019/0274064 A1 | 9/2019 | Chapman et al. |
| 2020/0110627 A1 | 4/2020 | Chou et al. |
| 2020/0267576 A1 | 8/2020 | Bedekar et al. |
| 2020/0389797 A1 | 12/2020 | Ashrafi |
| 2022/0383118 A1* | 12/2022 | Nair ...................... G06N 3/084 |

OTHER PUBLICATIONS

Thomas Derham et al., "3GPP WLAN integration in 5G System—Release 17", IEEE, doc.: IEEE 802.11-19/1215r0, Jul. 15, 2019, 11 pages.

Cisco, "Release Notes for NBAR2 Protocol Pack 37.0.0 for Cisco Wireless Controllers", Oct. 11, 2019, 22 pages.

Ignacio Labrador Pavon (Atos) et al., "5G NORMA network architecture—Final report", Doc. No H2020-ICT-2014-2 5G NORMA/D3.3, Version 1, Oct. 16, 2017, 204 pages.

Xiao-Yong Li et al., "Multi-Tenancy Based Access Control in Cloud", IEEE, Date Added to IEEE Xplore: Dec. 30, 2010, 2010, International Conference on Computational Intelligence and Software Engineering, Date of Conference: Dec. 10-12, 2010, 4 pages.

International Telecommucation Union, "Operation, administration and maintenance (OAM) functions and mechanisms for Ethernet-based networks", Rec. ITU-T G.8013/Y.1731, Aug. 2015, 102 pages.

* cited by examiner

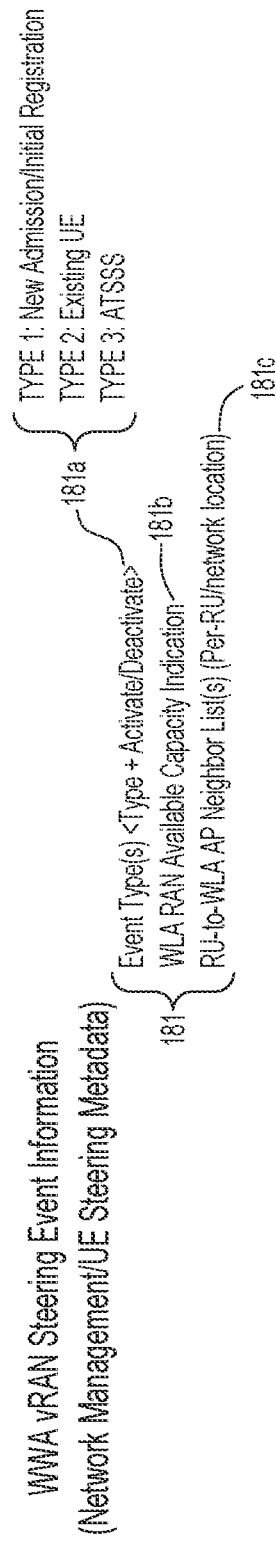
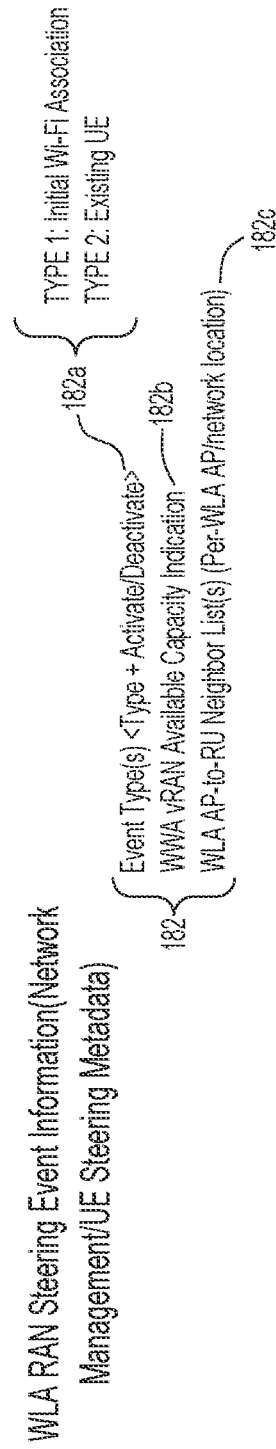
FIG. 1B
FIG. 1C

200 ─┐

202 — Obtain, by the network management system, first performance metrics associated with a first plurality of links of a WWA vRAN in which the first plurality of links include fronthaul links interconnecting a plurality of WWA RUs and at least one DU, midhaul links interconnecting the at least one DU and at least one CU, and one or more backhaul links interconnecting the at least one CU and a mobile core network

202a — First performance metrics associated with the first plurality of links of the WWA vRAN can include link utilization for the first plurality of links and packet loss for the first plurality of links

202b — First performance metrics associated with the first plurality of links of the WWA vRAN can include load for the plurality of WWA RUs, the at least one DU, and the at least one CU

204 — Obtain, by the network management system, second performance metrics associated with a second plurality of links for a WLA RAN in which the second plurality of links include a plurality of links between a plurality of WLA radio nodes (APs) and a controller of the WLA RAN

204a — Second performance metrics associated with the second plurality of links for the WLA RAN can include link utilization for the second plurality of links and packet loss for the second plurality of links

204b — Second performance metrics associated with the second plurality of links for the WLA RAN can include load for the plurality of WLA radio nodes and the controller of the WLA RAN

206 — In response to determining that one of the WWA vRAN is experiencing degraded performance based on the first performance metrics or that the WLA RAN is experiencing degraded performance based on the second performance metrics, activating, by the network managemeny system, a steering event that causes, at least in part, an indication to be communicated to a UE to cause the UE to connect to the WWA vRAN or to the WLA RAN that is not experiencing degraded performance

206a — Upon determining that one or more of the first performance metrics satisfies one or more threshold levels to determine that the WWA vRAN is experiencing degraded performance, determine that there is available capacity in the WLA RAN before activating the steering event

206b — Upon determining that one or more of the second performance metrics satisfies one or more threshold levels to determine that the WLA RAN is experiencing degraded performance, determining that there is available capacity in the WWA vRAN before activating the steering event

FIG.2

USER EQUIPMENT STEERING ACROSS A WIRELESS WIDE AREA DISAGGREGATED VIRTUALIZED RADIO ACCESS NETWORK AND A WIRELESS LOCAL AREA RADIO ACCESS NETWORK

TECHNICAL FIELD

The present disclosure relates to network equipment and services.

BACKGROUND

Networking architectures have grown increasingly complex in communications environments, particularly mobile networking environments. In particular, wireless wide area (WWA) virtualized radio access network (vRAN) architectures have been developed to provide radio coverage for mobile networks, such as Third Generation Partnership Project (3GPP) Fifth Generation (5G) mobile networks. The introduction of WWA vRAN architectures presents new opportunities for managing user equipment connectivity across a WWA vRAN, such as a 3GPP 5G vRAN, and a wireless local area (WLA) access network, such as a Wi-Fi® access network.

BRIEF DESCRIPTION OF THE DRAWINGS

FIG. 1B is a schematic diagram illustrating example details for communicating WWA vRAN steering event information to a mobile core network, according to an example embodiment.

FIG. 1C is a schematic diagram illustrating example details for communicating WLA RAN steering event information to a wireless local area network (LAN) controller (WLC), according to an example embodiment.

FIG. 2 is a flow chart depicting a method according to an example embodiment.

DESCRIPTION OF EXAMPLE EMBODIMENTS

Overview

Figure 1A:
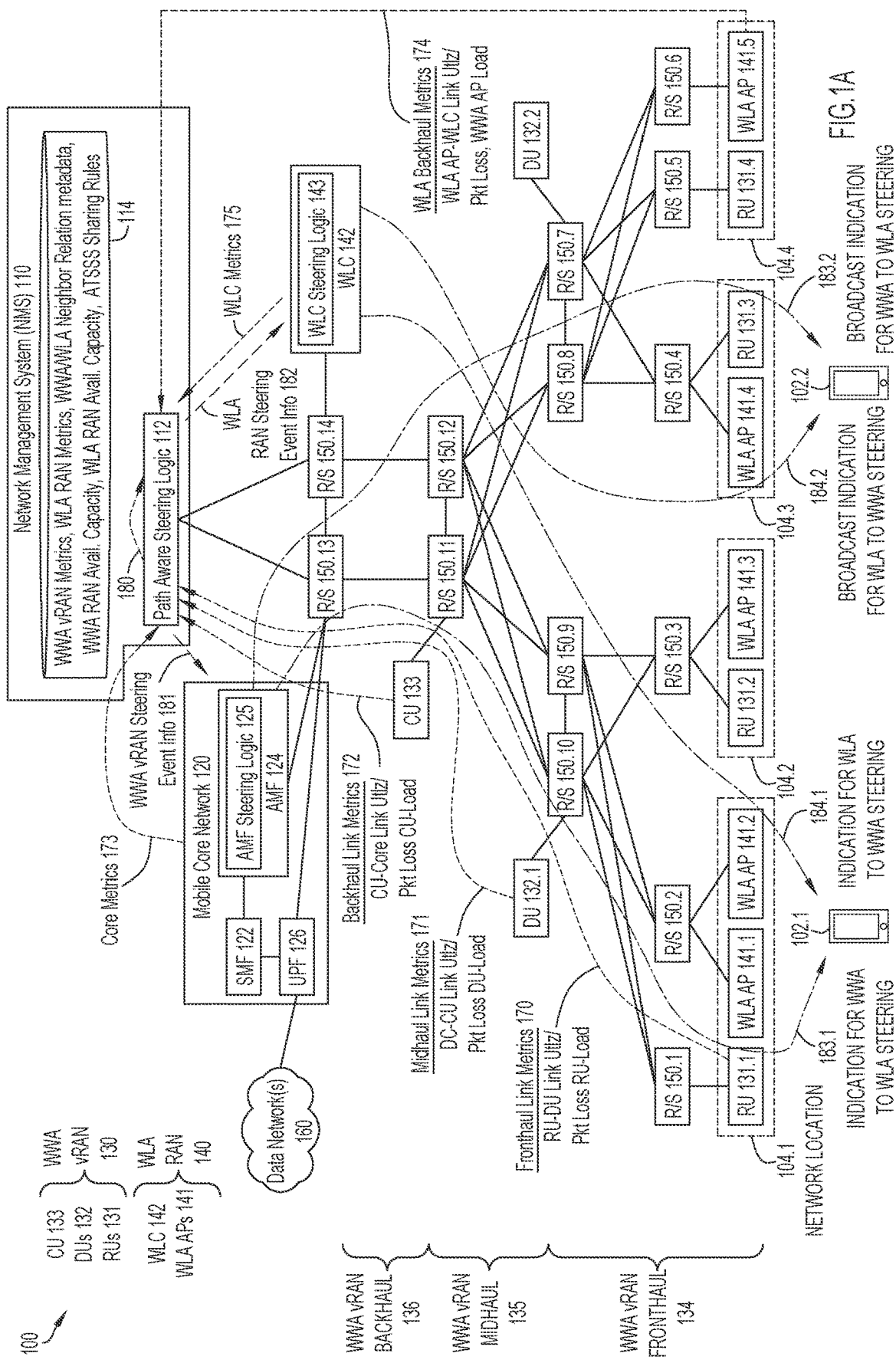
FIG. 1A is a diagram of a system in which techniques may be implemented to facilitate user equipment (UE) steering across a wireless wide area (WWA) disaggregated virtualized Radio Access Network (vRAN) and a wireless local area (WLA) Radio Access Network (RAN), according to an example embodiment.

The concept of a disaggregated virtualized Radio Access Network (RAN) architecture for Third Generation Partnership Project (3GPP) Fifth Generation (5G) brings new considerations related to fronthaul, backhaul, and midhaul connectivity links, each with potentially its own capacity Centralized Unit/Distributed Unit compute resources. Presented herein are techniques involving vRAN path-aware steering logic that provides for the ability to initiate steps to steer user equipment (UE) between accesses, such as between wireless wide area (e.g., cellular) and wireless local area (e.g., Wi-Fi) accesses, in order to provide improved bandwidth for handling UE traffic.

In one embodiment, a method is provided that may include obtaining first performance metrics associated with a first plurality of links of a wireless wide area (WWA) virtualized Radio Access Network (vRAN) in which the first plurality of links include fronthaul links interconnecting at plurality of WWA radio nodes, also referred to herein as Radio Units (RUs), and at least one Distributed Unit (DU), midhaul links interconnecting the at least one DU and at least one Central Unit (CU), and one or more backhaul links interconnecting the at least one CU and a mobile core network. The method may further include obtaining second performance metrics for a second plurality of links for a wireless local area (WLA) Radio Access Network (RAN) in which the second plurality of links include a plurality of communication links between a plurality of WLA radio nodes, such as WLA access points (APs), and a controller of the WLA RAN, such as a wireless local area network (LAN) controller (WLC). The method may further include, in response to determining that one of the WWA vRAN is experiencing degraded performance based on the first performance metrics or the WLA RAN the second performance metrics, activating a steering event that causes, at least in part, an indication to be communicated to a user equipment (UE) to cause the UE to connect to the WWA vRAN or the WLA RAN that is not experiencing degraded performance. Other operations may be performed as discussed for various embodiments herein.

Example Embodiments

As referred to herein, a wireless wide area (WWA) access network, such as a cellular/Third (3rd) Generation Partnership Project (3GPP) access networks, may be characterized as a Radio Access Network (RAN) having radio nodes such as evolved Node Bs (eNBs or eNodeBs) for Fourth (4th) Generation (4G)/Long Term Evolution (LTE) access networks, next generation Node Bs (gNBs or gNodeBs) for Fifth (5th) Generation (5G) and/or next Generation (nG) access networks, and/or the like that provide a larger RAN coverage area as compared to the RAN coverages area typically provided by wireless local area (WLA) radio nodes (e.g., Institute of Electrical and Electronics Engineers (IEEE) 802.11 access points, Wi-Fi® access points, Wi-Fi6® access points, etc.) for a WLA access network, also referred to as a wireless local area network (WLAN). Stated differently, the WWA RAN coverage area provided by a WWA radio node is typically larger (sometimes orders of magnitude larger, for example, up to a ratio of 1:5, depending on spectrum and power regulations) than the WLA RAN coverage area provided by a WLA radio node. Additionally, a WWA RAN radio node can typically provide radio access connectivity for a larger number of devices as compared to a WLA RAN radio node. Depending on implementation, any combination of WWA and/or WLA RANs may be utilized to facilitate connections between one or more devices and any combination of Local Area Networks (LANs), such as an enterprise network for an enterprise location; Wide Area Networks (WANs), such as the Internet, multiple enterprise networks spread across multiple locations; Software Defined WAN (SD-WAN); and/or any other network architecture/environment.

Discussed herein are features associated with virtualized RAN (vRAN) architectures that may be provided for different radio accesses. In some instances, a vRAN architecture can be implemented as a disaggregated vRAN architecture that includes the split of a base station, such as a gNB, into a Central (or Centralized) Unit (CU), one or several Distributed Units (DUs), and one or several Radio Units (RUs). Further disaggregation may include separation of the CU into a Central Unit Control Plane (CU-CP) component and a Central Unit User Plane (CU-UP) component. In some instances, certain vRAN components may also be referred to as virtualized components (e.g., virtualized DU (vDU) components, and/or virtualized CU (vCU) components). For a vRAN architecture, one or more RU(s) can interface with a DU component, which further interfaces with a CU-CP component and a CU-UP component. In some instances, such as for shared cell vRAN architectures as discussed in further detail herein, multiple DUs (each interfacing with corresponding RU(s)) can interface with a CU-CP component and a CU-UP component.

In some instances, an access network, such as a WWA access network, may be referred to as a private access network. By 'private' it is meant that a private WWA access network (e.g., a Citizen Broadband Radio Service (CBRS) access network and/or a 3GPP cellular (4G/LTE, 5G, nG, etc.) access network) may provide network connectivity/services to clients (e.g., users/user equipment/devices/etc.) served by a network operator and/or service provider of the private WWA access network, such as an enterprise. In one example, a private WWA access network may be considered to be a network that may be implemented to serve enterprise purposes (e.g., business purposes, government purposes, educational purposes, etc.) for enterprise clients (e.g., enterprise users/user equipment/devices/etc.) in which the private WWA access network may be operated by any combination of traditional public mobile network operators/service providers, enterprises network operators/service providers (e.g., Cisco®, etc.), and/or third party network operators/service providers (e.g., neutral host network operators/service providers, cloud service providers, etc.). A private network may also be referred to as a standalone non-public network (SNPN) or a Public Network Integrated Non-Public Network (PNI-NPN) in some instances. Cisco is a registered trademark of Cisco Technology, Inc.

Various techniques discussed for embodiments herein are described with reference to 'steering' a user equipment (UE) from connecting to (e.g., for an initial connection of the UE) and/or from being connected to (e.g., for a current connection of the UE) one access network type, such as a WWA (e.g., cellular) access network, to cause the UE to connect to another access network type, such as a WLA (e.g., Wi-Fi) access network. For example, steering can include steering a UE from a WWA access network (for an initial/current connection involving the WWA access network) to cause the UE connect to a WLA access network or, vice-versa, can include steering a UE from a WLA access network (for an initial/current connection involving the WLA access network) to cause the UE to connect a WWA access network.

Broadly, steering may include causing a UE to connect to any of: a particular access network type, a particular radio node of a particular access network type, a radio node selected by the UE of several potential radio nodes of a particular access network type (e.g., one radio node of several neighboring radio nodes as selected by the UE), combinations/extensions/variations thereof, and/or the like.

Current enterprise networks typically rely on Wi-Fi access as the dominant medium of providing connectivity to enterprise users. The Wi-Fi architecture is relatively straightforward involving a number of Wi-Fi access points (APs) that connect to and are managed/operated via a wireless LAN controller (WLC). Typically, each can AP have a fixed and consistent bandwidth via WLA backhaul and, hence, such an architecture can often support the bandwidth of hungry client devices in a consistent manner. Generally, the WLA backhaul can be considered the link between the WLC and a given WLA AP or the link between a given WLA AP and the first hop router to which it is connected.

Analysis of a typical 5G vRAN architecture reveals the disaggregated nature of the architecture, involving RU, DU, and CU elements. Each of these elements can be implemented in variety of form factors, each potentially having different supported capacity including the connectivity links between these elements. In some instances, the elements could be developed by different vendors with different capabilities. In still some instances, DU capacity can be constrained by capacity of hardware accelerator cards involving Field Programmable Gate Array (FPGA) and/or Application Specific Integrated Circuit (ASIC) hardware elements that are often used for processing upper physical (PHY) layer functions in a 7.2× fronthaul split approach, as defined by the Open RAN (O-RAN) Alliance.

WLA/Wi-Fi access and private WWA/5G access are expected to be the primary access mediums in enterprise deployments in the near future. In current deployments, WWA and WLA accesses operate independently of each other and make steering decisions independently, without considering the observed bandwidth, performance, and/or load factor(s) exhibited on the other access technology. Although the theoretical throughput available with 5G New Radio (NR) radios may be higher than what Wi-Fi supports and the users may be under excellent radio coverage with higher Reference Signal Received Power (RSRP) and/or Reference Signal Received Quality (RSRQ) values, potential capacity limitations of each of vRAN disaggregated elements (RU, DU, and CU), WWA vRAN fronthaul/midhaul/backhaul and/or WLA AP to WLC (generally or collectively referred to as 'x-haul') connectivity links (e.g., interfaces, connections, etc. facilitating connectivity between the elements) involving interconnections of the disaggregated elements with each other and with a mobile core network can restrict the "actual" bandwidth available to users/user equipment (UEs) connected to a vRAN.

Further, for a given split PHY between DU and RU elements, bandwidth involved on fronthaul links can increase substantially as the links may carry In-phase and Quadrature (IQ) radio signal samples over a Common Public Radio Interface (CPRI) protocol or enhanced CPRI (eCPRI) protocol streams such that bandwidth can become four times more expensive. Such increased bandwidth demand on the fronthaul links can impact user experience for users/UEs connected to a 5G access network, even with excellent signal coverage (e.g., 5-bar/full-bar) appearing in the client devices.

Current steering techniques for steering a given UE between WLA and WWA accesses typically relies on the signal strength as measured by the UE such that signal strength is considered a proxy to throughput and thus, user experience. However, as described above this approach may be flawed when considering a disaggregated WWA vRAN architecture due to multiple disjointed x-haul links and/or hardware capacities of various elements, such as FPGA capacity of DU elements, etc.

Presented herein are steering techniques that address the currents limitations for UE steering that are often based on signal strength measurements/information alone by providing for the ability to gather and analyze various path metrics and network element metrics in order to determine one or more WWA and/or WLA steering events that may facilitate enhanced UE steering between WWA and WLA accesses.

Referring to FIG. 1A, FIG. 1A is a block diagram of a system 100 in which techniques may be implemented to facilitate UE steering across a WWA disaggregated vRAN and a WLA RAN, according to an example embodiment. System 100 may represent a converged enterprise WWA/WLA network including a network management system (NMS) 110, a mobile core network 120, a WWA disaggregated vRAN 130 (also referred to herein as WWA vRAN 130), a WLA RAN 140, and routing/switching (R/S) network elements 150.1, 150.2, 150.3, 150.4, 150.5, 150.6, 150.7, 150.8, 150.9, 150.10, 150.11, 150.12, 150.13, and 150.14 (also referred to herein generally or collectively as R/S network elements 150). Also shown in FIG. 1A are UEs, including a first UE 102.1 (also referred to herein as UE 102.1) and a second UE 102.2 (also referred to herein as UE 102.2) and one or more data network(s) 160.

NMS 110 may include path aware steering logic 112 and, as discussed in further detail herein, may store various respective WWA vRAN metrics and WLA metrics gathered/obtained from the WWA vRAN 130 and the WLA RAN 140, respectively, via memory/storage 114 configured for NMS 110 (e.g., one or more databases, etc.) to provide various operations for system 100 in order to facilitate a UE steering across WWA vRAN 130 and WLA RAN 140. In at least one embodiment, the NMS 110 may be implemented as an enhanced 3GPP Operations, Administration, and Maintenance (OAM) network element to facilitate various UE steering operations described herein. In at least one embodiment, the NMS 110 may be implemented as a Cisco® Digital Network Architecture Center (DNAC) and/or a Cisco® RAN Element Management System (RAN-EMS).

In at least one embodiment, mobile core network 120 may be representative of a 5G core network or system (5GC/5GS), sometimes referred to as a 5G packet core, including a Session Management Function (SMF) 122, an Access and Mobility Management Function (AMF) 124, and a User Plane Function (UPF) 126. AMF 124 may include AMF steering logic 125 to facilitate various WWA to WLA steering operations, as discussed in further detail herein. Although not illustrated, mobile core network 120 may also include any combination of 4G/nG network elements. For the mobile core network 120, the SMF 122 may interface with the AMF 124 and the UPF 126. The UPF 126 may further interface with data network(s) 160, which may be any combination of the Internet, an Internet Protocol (IP) Multimedia Subsystem (IMS), Ethernet network, Ethernet switching system(s), and/or the like. In some instances, data network(s) 160 may be inclusive of any enterprise cloud/server farm. It is to be understood that other network elements may be configured for mobile core network 120 for any combination of 3G/4G/5G/nG implementations, such as, a Policy Control Function (PCF), a Policy and Charging Rules Function (PCRF), a Network Slice Selection Function (NSSF), a Network Repository Function (NRF), a Unified Data Management (UDM) service, a Unified Data Repository (UDR), a Home Subscriber Server (HSS), a Mobility Management Entity (MME), a Serving Gateway (SGW), a Packet Data Network (PDN) Gateway (PGW), any Control and User Plane Separation (CUPS) components, and/or the like in accordance with any 3GPP specifications.

The WWA vRAN 130 may include WWA radio nodes, such as of Radio Units (RUs) 131, including a first RU 131.1 (also referred to herein as RU 131.1), a second RU 131.2 (also referred to herein as RU 131.2), a third RU 131.3 (also referred to herein as RU 131.3), and a fourth RU 131.4 (also referred to herein as RU 131.4). The WWA vRAN 130 may also include Distributed Units (DUs) 132, including a first DU 132.1 (also referred to herein as DU 132.1) and a second DU 132.2 (also referred to herein as DU 132.2). The WWA vRAN 130 may also include a CU 133. It is to be understood that the number of RUs 131, DUs 132, and CU 133 shown in FIG. 1A are provided for illustrative purposes only and are not meant to limit the broad scope of the present disclosure. Any number of RUs, DUs, and CUs may be implemented in a WWA vRAN in accordance with embodiments herein.

The WLA RAN 140 may include WLA radio nodes, such as WLA access points (APs) 141, including a first WLA AP 141.1 (also referred to herein as WLA AP 141.1), a second WLA AP 141.2 (also referred to herein as WLA AP 141.2), a third WLA AP 141.3 (also referred to herein as WLA AP 141.3), a fourth WLA AP 141.4 (also referred to herein as WLA AP 141.4), and a fifth WLA AP 141.5 (also referred to herein as WLA AP 141.5). The WLA RAN 140 may also include a WLC 142. Although not illustrated in FIG. 1A, it is to be understood that WLC 142 can also interface with data network(s) 160 via any combination of R/S network elements 150 such that the WLA RAN 140, including WLC 142 and WLA APs 141 can provide connectivity to forward frames toward the wired side (e.g., data network(s) 160). WLC 142 may also include WLC steering logic 143 to facilitate various WLA to WWA steering operations, as discussed in further detail herein. Connection between the WLC 142 and data network(s) 160 is not shown in FIG. 1A for purposes of brevity only. It is to be understood that the number of WLA APs 141.1-141.5 and WLC 142 shown in FIG. 1A are provided for illustrative purposes only and are not meant to limit the broad scope of the present disclosure. Any number of WLA APs and WLCs may be implemented in a WLA RAN in accordance with embodiments herein.

As discussed in further detail below, various RUs 131 and WLA APs 141 may be considered neighbors of each other for various network locations (e.g., buildings, campuses, parking lots, structures, etc.), such as network locations 104.1, 104.2, 104.3, and 104.4, which may represent physical locations of system 100 for which WWA/WLA coverage may be provided by neighboring RUs/WLA APs.

Interconnectivity among elements the NMS 110, the mobile core network 120, the WWA vRAN 130 (e.g., RUs 131, DUs 132, and CU 133) and the WLA RAN 140 (e.g., WLA APs 141.1-141.5 and WLC 142) may be facilitated via R/S network elements 150.1-150.14, which may provide a mesh network to facilitate interconnection/interfacing among the various elements of system 100. It is to be understood that the number of R/S network elements 150 shown in FIG. 1A are provided for illustrative purposes only and are not meant to limit the broad scope of the present disclosure. Any number of R/S network elements 150 may be implemented in system 100 in accordance with embodiments herein. Interconnections among R/S network elements 150 may be facilitated using any combination of wired and/or wireless interfaces/interconnections. In various embodiments, embodiments R/S network elements 150 (which can include virtualized network elements, functions, etc.) can encompass any network elements such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in the network environment of system 100, as described for various embodiments herein.

Although illustrated as single elements in FIG. 1A, it is to be understood that each R/S network element 150.1-150.14 may include multiple underlying R/S network elements, providing a sub-mesh/sub-network to facilitate connectivity among elements of system 100. Further, it is to be understood that additional interconnections among various R/S network elements 150 may be provided in any manner in accordance with embodiments herein.

As illustrated in FIG. 1A, each of RU 131.1 and RU 131.2 may interface with DU 132.1 via R/S network elements 150.1, 150.3, 150.10, and 150.9, such that RU 131.1 and RU 131.2 may be considered to be homed to/served by DU 132.1 in which DU 132.1 controls/manages operation of each of RU 131.1 and RU 131.2. Each of RU 131.3 and RU 131.4 may interface with DU 132.2 via R/S network elements 150.4, 150.5, 150.7, and 150.8 such that RU 131.3 and RU 131.4 may be considered to be homed to/served by DU 132.2 in which DU 132.2 controls/manages operation of each of RU 131.3 and RU 131.4.

The logical interface/interconnectivity between each of the RUs 131 and each the DUs 132 is typically referred to as a fronthaul network, which is illustrated for FIG. 1A as WWA vRAN fronthaul 134 (also referred to herein generally as fronthaul 134) in which the interconnections between each corresponding RU 131.1-131.4 and each corresponding DU 132.1-132.2 to which each RU is homed can be considered to be corresponding fronthaul links.

In addition to various steering operations that may be discussed for embodiments herein facilitated via NMS 110/path aware steering logic 112, an RU, such as any of RUs 131.1-131.4, may implement any combination of a WWA (e.g., cellular) and/or WLA (e.g., Wi-Fi®) air interface for any combination of Radio Access Technology (RAT) types (sometimes referred to more generally as 'accesses') for WWA vRAN 130 such as, but not limited to: 3GPP licensed spectrum accesses (e.g., 3rd Generation (3G), 4G/LTE, 5G, and/or next Generation (nG) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP unlicensed spectrum accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like.

Thus, an RU may be inclusive of any configuration/combination of 3GPP 4G/LTE evolved Node Bs (eNBs or eNodeBs), 5G next Generation Node Bs (gNBs or gNodeBs), and/or any other next Generation access nodes that may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G, nG, CBRS, etc.) through which one or more UEs, such as any of UEs 102.1 and/or 102.2, may utilize to connect to one or more RUs for one or more sessions (e.g., voice, video, data, gaming, combinations thereof, etc.). More generally, an RU may perform lower Physical (PHY) layer and RF operations to facilitate RF connections with one or more UE. The coverage area of a radio node such as an eNB, gNB, RU, etc. is typically referred to as a 'cell' in which one or more UE may attach to the radio node that serves the coverage area/cell such that service connection to a network may be facilitated via the cell provided by the radio node.

In addition to various steering operations that may be discussed for embodiments herein facilitated via NMS 110/path aware steering logic 112, a DU (also sometimes referred to as a baseband unit), such as DU 132.1 and DU 132.2, may provide control/management operations and radio signal processing operations for each of one or more RUs. Generally, control/management operations that may be provided by a DU for each of one or more RUs may include controlling/managing frequency allocation, bandwidth, cell identifier configuration (including Physical Cell Identifiers (PCIs) and Cell Global Identifiers (CGIs), cell broadcast information (to be included in a broadcast Master Information Block (MIB) and/or System Information Block(s) (SIB (s)), Sounding Reference Signal (SRS) configuration, Time Division Duplex (TDD) configuration, beamforming parameters, radio or spectral resources for Physical Resource Blocks (PRBs), and/or the like for each RU. Generally, radio signal processing operations provided by a DU for each of one or more RU (homed to the DU) may include, but not be limited to, lower level operations of the radio signal processing stack, such as Radio Link Control (RLC), Medium Access Control (MAC), and higher PHY layer operations, such as digital processing, including signal modulation and demodulation, channel encoding and decoding, and scheduling, among others.

The logical interface/interconnectivity between the DUs 132 and the CU 133 is typically referred to as a midhaul network, which is illustrated for FIG. 1A as WWA vRAN midhaul 135 (also referred to herein generally as midhaul 135). As illustrated in FIG. 1A, DU 132.1 may interface with CU 133 via a midhaul link/links facilitated by R/S network elements 150.10, 150.9, 150.11, and 150.12 and DU 132.2 may interface with CU 133 via a midhaul link/links facilitated by R/S network elements 150.7, 150.8, 150.11, and 150.12.

Further as illustrated for FIG. 1A, the CU 133 may interface with the mobile core network 120 and the NMS 110/path aware steering logic 112 via R/S network elements 150.11, 150.12, 150.13, and 150.14. In particular, the CU 133 may interface with the UPF 126 and the AMF 124. The logical interface/interconnectivity between CU 133 and elements of the mobile core network 120 is typically referred to as a backhaul network, which is illustrated for FIG. 1A as WWA vRAN backhaul 136 (also referred to herein generally as backhaul 136) in which backhaul links between CU 133 and mobile core network 120 can be facilitated via R/S network elements 150.11, 150.12, 150.13, and 150.14.

In addition to various steering operations that may be discussed for embodiments herein facilitated via NMS 110/path aware steering logic 112, a CU, such as CU 133, may provide upper level operations of a radio signal processing stack, such as user plane Packet Data Convergence Protocol (PDCP) functions and user plane Service Data Adaptation Protocol (SDAP), among others. The split of operations of a radio signal processing stack among between a DU a CU can be varied depending on implementation and/or configuration of a given WWA vRAN/network architecture. A CU, such as CU 133, can also provide operations for DU(s), such as DU 132.1 and DU 132.2, for the WWA vRAN 130 via Resource Control (RRC) functions and the control plane part of the PDCP protocol. In some embodiments, CU 133 may be further disaggregated into a CU-CP component and a CU-UP component.

In addition to various steering operations that may be discussed for embodiments herein facilitated via NMS 110/path aware steering logic 112, an AMF, such as AMF 124, may facilitate access and mobility management control/services, such as registration, authentication, etc. (e.g., via a UDM, PCF, etc.) for one or more UEs, such as UEs 102.1 and 102.2, for one or more over-the-air (OTA) RF connection(s) that may be established between the UEs 102.1/102.2 and one or more RUs 131 for establishing network connection between the UEs and the mobile core network 120 for UE sessions.

In addition to various steering operations that may be discussed for embodiments herein facilitated via NMS 110/path aware steering logic 112, an SMF, such as SMF 122, may be responsible for UE Protocol Data Unit (PDU) session management (SM), with individual functions/services being supported on a per-session basis in order to facilitate data transfer(s) between a UE and one or more data network(s) 160. Generally, a UPF, such as UPF 126, may operate as a Virtual or Virtualized Network Function (VNF) to provide packet routing and forwarding operations for user data traffic and may also perform a variety of functions such as packet inspection, traffic optimization, Quality of Service (QoS) functions, policy enforcement and user data traffic handling (e.g., to/from data network(s) 160), and billing operations (e.g., accounting, etc.) for UE 102.1/102.2 sessions.

Regarding WLA RAN 140, each of WLA APs 141.1-141.5 may interface with WLC 142 and WLC 142 may interface with NMS 110/path aware steering logic 112 via any combination of R/S network elements 150.1-150.14. The logical interface/interconnectivity between the WLA APs 141 and WLC 142 may be referred to herein as a WLA RAN backhaul (not labeled in FIG. 1A for purposes of brevity only). Generally, each of WLA APs 141.1-141.5 may be inclusive of a WLA radio node or device, such as a Wi-Fi/Wi-Fi6 access point and/or the like that may facilitate over-the-air RF connections for WLA RAN 140. In addition to various steering operations that may be discussed for embodiments herein facilitated via NMS 110/path aware steering logic 112, WLC 142 may provide/be responsible for WLA RAN 140 functions such as WLA RAN-based access association services, authentication services, authorization services, intrusion prevention, RF management, and/or the like to facilitate UE 102.1 and/or UE 102.1 connectivity via the WLA RAN 140 utilizing one or more of WLA APs 141.1-141.5. In some implementations, WLC 142 may be configured as an evolved WLC (eWLC).

Although illustrated in FIG. 1A as separate radio nodes, in some embodiments, an RU and WLA AP may be implemented as a combined radio node to facilitate WWA and WLA access network connectivity for one or more UEs.

A UE, such as each of UE 102.1 and UE 102.2, may be associated with any user, subscriber, employee, client, customer, electronic device, etc. wishing to initiate a flow in system 100 and may be inclusive of any device that initiates a communication in system 100, such as a computer, an electronic device such as an industrial device (e.g., a robot), automation device, enterprise device, appliance, Internet of Things (IoT) device (e.g., sensor, monitor, etc.), a laptop or electronic notebook, a router with a WWA/WLA interface, a WWA/WLA (cellular/Wi-Fi®) enabled telephone/smart phone, tablet, etc. and/or any other device, component, element, or object capable of initiating voice, audio, video, media, or data exchanges within system 100. It is to be understood that UEs discussed herein may also be configured with any combination of hardware (e.g., communications units, receiver(s), transmitter(s), transceiver(s), antenna(s) and/or antenna array(s), processor(s), memory element(s), baseband processor(s) (modems), etc.)], controllers, software, logic, and/or any other elements/entities that may facilitate over-the-air RF connections with one or more access networks. As referred to herein, the terms 'UE', 'UE device', 'client', 'client device', and/or variations thereof can be used interchangeably.

As referred to herein, interconnections/interfacing between various elements of system 100, such as, for example, interconnection/interfacing between R/S network element 150.1 and R/S network element 150.10; interconnection/interfacing between RU 131.1 and R/S network element 150.1; logical interconnection of WWA vRAN 130 elements via the fronthaul 134, midhaul 135, and/or backhaul 136 (inclusive of interconnections/interfacing between WWA vRAN 130 and mobile core network 120); interconnection of WLA RAN 140 elements such as between one or more of WLA AP(s) 141 and the WLC 142; interconnection among mobile core network 120 elements, combinations thereof, and/or the like may be referred to as 'communication links', 'links', and variations thereof, which are inclusive of interconnections/interfacing between two or more elements of system 100. For example, embodiments herein may be discussed with reference to WWA vRAN fronthaul links, WWA vRAN midhaul links, WWA vRAN backhaul links, WLA RAN backhaul links, x-haul links (referring generally or collectively to any combination of WWA vRAN fronthaul, midhaul, backhaul, and/or WLA AP to WLC links (e.g., WLA RAN backhaul links)), etc.

Consider various operational examples involving steering that may be provided for UE 102.1 and/or UE 102.2 by NMS 110, via path aware steering logic 112, for system 100. Broadly during operation of system 100, NMS 110, via path aware steering logic 112 may collect Key Performance Indicators (KPIs) or, more generally performance metrics, gathered from elements of the mobile core network 120 elements (e.g., SMF 122, AMF 124, and UPF 126), the WWA disaggregated vRAN 130 elements (e.g., RUs 131, DUs 132, and CU 133), and the WLA RAN 140 elements (e.g., WLA APs 141.1-141.5 and WLC 142) and processes the KPIs/performance metrics to determine whether there is degraded performance degraded performance for a given RAN (degraded performance for WWA vRAN 130 or WLA RAN 140). Any KPIs/performance metrics collected for WWA vRAN 130 as discussed herein, generally shown in FIG. 1A as 'WWA vRAN metrics' and any KPIs/performance metrics collected for WLA RAN 140 as discussed herein, generally shown in FIG. 1A as 'WWA RAN metrics', can be stored/maintained via any combination of memory/storage 114 for NMS 110.

Based on determining degraded performance for a given RAN (e.g., for WWA vRAN 130 or WLA RAN 140), NMS 110/path aware steering logic 112 determine a steering decision (as generally shown at 180 of FIG. 1A) and generates or activates one or more steering events to facilitate WWA to WLA or WLA to WWA steering for one or more of UE 102.1 and/or 102.2.

In at least one embodiment, UEs 102.1 and 102.2 can be configured with connectivity management logic in order to: 1) take actions on the metadata sent by the access network (e.g., action(s) could be automated through a setting and/or a user can select an option provided by access network); or 2) ignore the assistance of the network and continue to remain connected but obtain sub-optimal service.

For example, as shown in FIG. 1A, one or more WWA vRAN steering events can be activated such that WWA vRAN steering event information (info) 181 can be sent to the mobile core network 120 (e.g., sent to AMF 124, as discussed in further detail herein) that can cause, in some embodiments, one or more steering indications to be provided to UE 102.1 (generally illustrated as dashed-line 183.1) via an RU, such as RU 131.1, that include UE steering metadata to cause UE 102.1 to connect to WLA RAN 140 and/or to UE 102.2 (generally illustrated as dashed-line 183.2) via an RU, such as RU 131.3, to cause UE 102.2 to connect to WLA RAN 140.

In another example, one or more WLA RAN steering events can be activated for WLA RAN 140 such that WLA RAN steering event information (info) 182 can be sent to WLC 142 that can cause, in some embodiments, one or more steering indications to be provided to UE 102.1 (generally illustrated as dashed line 184.1) via a WLA AP, such as WLA AP 141.2, that include UE steering metadata to cause UE 102.1 to instead connect to WWA vRAN 130 and/or to UE 102.2 (generally illustrated as dashed line 184.2) via a WLA AP, such as WLA AP 142.3, to cause UE 102.2 to connect to WWA vRAN 130.

Additional details related to various WWA vRAN steering events/steering event information 181 sent to mobile core network 120/AMF 124 and WLA RAN steering events/steering event information 182 sent to WLC 142 are discussed in further detail below. However, before discussing details related to different steering events, consider various details related to KPIs/performance metrics that can be obtained by NMS 110/path aware steering logic 112, which can be processed/analyzed and may trigger one or more steering events.

In various embodiments, KPIs/performance metrics can include KPIs/performance metrics of the x-haul links and load metrics for various WWA vRAN 130 and WLA RAN 140 elements. For example, fronthaul link metrics 170 can be obtained by NMS 110/path aware steering logic 112 that may include link utilization (utlz) and packet (pkt) loss metrics for each fronthaul 134 link (e.g., RU 131.1-DU 132.1 link, RU 131.2-DU 132.1 link, RU 131.3-DU 132.2 link, and RU 131.4-DU 132.2 link) as well as RU load metrics for each RU 131.1, 131.2, 131.3, and 131.4. In various embodiments, RU load metrics can include number of UE sessions handled by an RU, radio utilization/load, RU processing (e.g., central processing unit CPU) utilization/load, and/or the like. Although the example fronthaul link metrics 170 are shown in FIG. 1A as coming from RU 131.1, it is to be understood that fronthaul link metrics 170 can be obtained by NMS 110/path aware steering logic 112 from each of RU 131.1, 131.2, 131.3, and 131.4.

In another example, midhaul link metrics 171 can be obtained by NMS 110/path aware steering logic that may include link utilization and packet loss metrics for each midhaul 135 link (e.g., DU 132.1-CU 133 link and DU 132.2-CU 133 link) as well as DU load metrics for each DU 132.1 and 132.2. In various embodiments, DU load metrics can include number of UE sessions handled by a DU, DU processing utilization/load, DU throughput/bandwidth utilization/load, and/or the like. Although the example midhaul link metrics 171 are shown in FIG. 1A as coming from DU 132.1, it is to be understood that midhaul link metrics 171 can be obtained by NMS 110/path aware steering logic 112 from each of DU 132.1 and DU 132.2.

In another example, backhaul link metrics 172 can be obtained by NMS 110/path aware steering logic 112 that can include link utilization (utlz) and packet (pkt) loss metrics for the WWA vRAN backhaul 136 link between CU 133 and mobile core network 120 as well as CU load metrics for CU 133. In various embodiments, CU load metrics can include number of UE sessions handled by a CU, CU processing utilization/load, CU throughput/bandwidth utilization/load, and/or the like.

In another example, core metrics 173 can be obtained by NMS 110/path aware steering logic 112 that can include utilization/load metrics for mobile core network 120, such as number of UE sessions handled by the mobile core network 120, resource utilization/load for one or more elements of mobile core network 120 (e.g., SMF 122, AMF 124, UPF 126), throughput/bandwidth utilization/load for mobile core network 120, and/or the like.

In another example, WLA backhaul metrics 174 can be obtained by NMS 110/path aware steering logic 112 that may include link utilization and packet loss metrics for each WLA backhaul link (e.g., WLA AP 141.1-WLC 142 link, WLA AP 141.2-WLC 142 link, WLA AP 141.3-WLC 142 link, WLA AP 141.4-WLC 142 link, and WLA AP 141.5-WLC 142 link) as well as WLA AP load metrics for each WLA AP 141.1, 141.2, 141.3, 141.4, and 141.5. Although the example WLA backhaul metrics 174 are shown in FIG. 1A as coming from WLA AP 141.5, it is to be understood that WLA backhaul metrics 174 can be obtained by NMS 110/path aware steering logic 112 from each of WLA AP 141.1, 141.2, 141.3, and 141.4. In various embodiments, WLA AP load metrics can include number of UE sessions handled by a WLA AP, radio utilization/load, WLA AP processing utilization/load, and/or the like.

In yet another example, WLC metrics 175 can be obtained by NMS 110/path aware steering logic 112 that may include utilization/load metrics for WLC 142, such as number of UE sessions handled by the WLC 142, resource utilization/load for WLC 142, throughput/bandwidth utilization/load WLC 142, and/or the like.

Generally, a load, utilization, etc. metric (e.g., radio utilization, link utilization, processing utilization, etc.), can be provided to path aware steering logic 112 as any of: a percentage or factor of an amount of resources (e.g., radio resources for radio utilization, link bandwidth for link utilization, processing resources for processing utilization, etc.) in use and/or reserved for use for a given link/element/function as compared against a total amount of resources provisioned for the link/element; a raw number or value associated with a load or utilization metric, which path aware steering logic 112 can use to calculate a load or utilization metric; combinations thereof; and/or the like.

In various embodiments, various metrics 170, 171, 172, and 173 related to mobile core network 120/WWA vRAN 130 (generally shown in memory/storage 114 as 'WWA vRAN metrics') and metrics 174 and 175 related to WLA RAN 140 (generally shown in memory/storage 114 as 'WLA RAN metrics') obtained by NMS 110/path aware steering logic 112 can be obtained using any combination of push/pull techniques, in which NMS 110/path aware steering logic 112 can query (e.g., using a pull technique) one or more elements of mobile core network 120, WWA vRAN 130, and/or WLA RAN 140 in some embodiments to obtain one or more metrics and/or one or more elements of mobile core network 120, WWA vRAN 130, and/or WLA RAN 140 and/or one or more mobile elements of mobile core network 120, WWA vRAN 130, and/or WLA RAN 140 can report (e.g., using a push technique) one or more metrics to NMS 110/path aware steering logic 112 in some embodiments. In various embodiments, metrics can be obtained by NMS 110/path aware steering logic 112 (using various push/pull techniques) periodically, based on one or more network events (e.g., failure of an element, addition of an element, etc.), combinations thereof and/or the like.

In various embodiments, various metrics 170-175 can be obtained by NMS 110/path aware steering logic 112 using any combination of standardized techniques and well-defined probes for performing IP path measurements, such as bi-directional probes based on User Datagram Protocol (UDP), Internet Control Message Protocol (ICMP), Transmission Control Protocol (TCP), Hypertext Transfer Protocol (HTTP), protocols with varied packet sizes, different frequencies, burst rates, etc., any of which can be used for measuring any combination of jitter, latency, packet loss, load, link utilization and/or the like for characterizing network paths/links for system 100. In some embodiments, eCPRI message 5, as defined by eCPRI/O-RAN, can be used for delay measurement purposes.

Further, in some embodiments, the fronthaul can send reports regarding receive window operation characterizing radio performance metrics for WWA radio links with UEs. For example, because timing loops for scheduling radio resources (e.g., uplink/downlink radio transmission resources), an RU 131, which can be configured as an O-RAN RU (O-RU) per O-RAN standards in some instances, and/or a DU 132, which can be configured as an O-RAN DU (O-DU) per O-RAN standards in some instances, can send reports regarding 'on-time', 'too-early', and 'too-late' statistics for control and user plane flows that can be used by NMS 110/path aware steering logic 112 to characterize network paths/links (including wireless/radio links) for system 100.

In at least one embodiment, network management steering metadata can be configured for NMS 110 via memory/storage 114 to facilitate various steering operations as discussed herein. For example, in at least one embodiment, network management steering metadata can include WWA/WLA neighbor relation metadata can be configured for NMS 110 that identifies WLA AP neighbors of WWA RUs and vice-versa for each of network locations 104.1, 104.2, 104.3, and 104.4. Generally, WWA/WLA neighbors can be statically and/or dynamically configured and tied to a given network location based on administrator configuration provided for NMS 110, measurement reports obtained for one or more of UEs 102.1 and/or 102.2 from which signal strength information for one or more RUs/WLA APs can be determined, combinations thereof, and/or the like. In one example, RU 131.1 may be configured as a neighbor of each of WLA AP 141.1 and WLA AP 141.2 for network location 104.1; RU 131.2 can be configured as a neighbor of WLA AP 141.3 for network location 104.2; RU 131.3 can be configured as a neighbor of WLA AP 141.4 for network location 104.3; and RU 131.4 can be configured as a neighbor of WLA AP 141.5 for network location 104.4. As network locations may be varied depending on scale (e.g., network locations 104.1 and 104.2 a subset of a larger network location, such as floors of a building, sections of a parking lot, seating areas/levels of a stadium, etc.), neighbor relations can vary. For example, in some instances, RU 131.1 and RU 131.2 can be configured as neighbors of each of WLA AP 141.1, WLA AP 141.2, and WLA AP 141.3 as a first set of neighbors and RU 131.3 and RU 131.4 can be configured as neighbors of each of WLA AP 141.4 and WLA AP 141.5. These examples are only a few of the potential neighbor configurations that could be provided for a converged WWA/WLA enterprise network, such as shown in system 100, and are not meant to limit the broad scope of the present disclosure. Other neighbor configurations can be envisioned, which may facilitate various steering operations as discussed herein.

Different steering metadata is discussed herein, including network management steering metadata and UE steering metadata. Generally, network management steering metadata may be characterized as a superset of steering metadata maintained by NMS 110 whereas UE steering metadata may represent a subset of the network management steering metadata that may be included in WWA vRAN steering event information 181 to be utilized by AMF 124 and/or WLA RAN steering event information 182 to be utilized by WLC 142 to facilitate various UE-specific steering events, as discussed for various examples herein. Thus, it is to be understood that network management steering metadata and UE steering metadata discussed herein can overlap in whole or in part to facilitate various operations discussed herein. For example, steering metadata included in WWA vRAN steering event information 181 and/or included in WLA RAN steering event information may be characterized as 'network management/UE steering metadata'.

In various embodiments, a given neighbor RU for a given WLA AP for a given network location can be identified to a UE using any combination of PCI and/or CGI for the given neighbor RU (e.g., PCI for 4G/LTE or New Radio (NR)-PCI for 5G and/or Evolved Universal Mobile Telecommunications System (UMTS) Terrestrial Radio Access Network (E-UTRAN) CGI (E-CGI) for 4G/LTE or NR-CGI for 5G). In various embodiments, a given neighbor WLA AP for a given RU can be identified to a UE using a Basic Service Set Identifier (BSSID) for the given WLA AP Other network management steering metadata stored/maintained in memory/storage 114 of NMS 110 may include WWA vRAN available capacity and WLA RAN available capacity in which WWA vRAN available capacity be calculated by path aware steering logic 112 using the WWA vRAN metrics (170, 171, 172, and 173, as discussed herein) obtained from mobile core network 120/WWA vRAN 130 and WLA RAN available capacity can be calculated by path aware steering logic 112 using the WLA RAN metrics (174 and 175, as discussed herein), for example, based on IP performance metrics, delay metrics (e.g., using eCPRI message 5), and/or radio performance metrics obtained by NMS 110/path aware steering logic 112, as discussed herein.

Other network management steering metadata that may be utilized to facilitate UE steering can be envisioned. For example, in some instances, one or more Access Traffic, Steering, Switching, and Splitting (ATSSS) policies can be configured as network management steering metadata such that different ATSSS sharing rules can be triggered based on bandwidth pressure/degradation that may be experienced by the mobile core network 120/WWA vRAN 130 or the WLA RAN 140 (e.g., traffic split for UEs under normal conditions may include X % of traffic to the WWA vRAN 130 and Y % of traffic to the WLA RAN 140 and a traffic split for instances in which the WWA vRAN 130 is experiencing degraded performance may include (X−N) % of traffic to the WWA vRAN 130 and (Y+N) % of traffic to the WLA RAN 140).

As noted above, during operation, NMS 110/path aware steering logic 112 can (as generally shown at 180) process the WWA vRAN metrics obtained from the mobile core network 120/WWA vRAN 130 and the WLA RAN metrics obtained from the WLA RAN 140 to determine whether the WWA vRAN 130 or the WLA RAN 140 is experiencing degraded performance and, based on determining that a given RAN is experiencing degraded performance, can determine a steering decision and activate one or more steering events to facilitate WWA to WLA steering or WLA to WWA steering, as shown in FIG. 1A) in order to cause one or more of UEs 102.1 and/or 102.2 to connect to the RAN that is not experiencing degraded performance.

Broadly, determining that one of the WWA vRAN 130 or the WLA RAN 140 is experiencing degraded performance can include determining one of: that one or more of the WWA vRAN metrics satisfies (e.g., meets, breaches, etc.) one or more threshold levels configured for the WWA vRAN 130 (e.g., configured for links/elements involving the mobile core network 110/WWA vRAN 130) to determine that the WWA vRAN 139 is experiencing degraded performance; or that one or more of the WLA RAN metrics satisfies (e.g., meets, breaches, etc.) one or more threshold levels configured for the WLA RAN 140 (e.g., configured for links/elements involving the WLA RAN 140) to determine that the WLA RAN 140 is experiencing degraded performance.

In one example, each x-haul link and/or element involving the WWA vRAN 130 and the WLA RAN 140 can be configured with a maximum threshold limit such that satisfying the maximum threshold limit of a given link and/or element for a given RAN can be used as bandwidth pressure event trigger to activate one or steering event(s) by the NMS 110/path aware steering logic 112 in order to cause one or more of UEs 102.1 and/or 102.2 to connect to the RAN that is not experiencing bandwidth pressure and that has available capacity.

Consider FIG. 2, which is a flow chart depicting a method 200 according to an example embodiment. In at least one embodiment, method 200 illustrates example operations that may be performed, at least in part, by an NMS via path aware steering logic, such as NMS 110 via path aware steering logic 112, according to an example embodiment.

Consider, at 202 that the method may include obtaining, by the NMS/path aware steering logic, first performance metrics associated with a first plurality of links of a WWA vRAN (e.g., WWA vRAN 130) in which the first plurality of links include fronthaul (e.g., fronthaul 134) links interconnecting a plurality of WWA RUs and at least one DU (e.g., interconnecting RUs 131.1-131.2 and DU 132.1 and RUs 131.3-131.4 and DU 132.2), midhaul links (e.g., midhaul 135) interconnecting the at least one DU and at least one CU (e.g., interconnecting DUs 132.1 and 132.2 with CU 133), and backhaul links interconnecting the at least one CU and a mobile core network (e.g., interconnecting CU 133 and mobile core network 120).

As shown at 202a, the first performance metrics associated with the first plurality of links of the WWA vRAN can include link utilization for the first plurality of links and packet loss for the first plurality of links. As shown at 202b, the first performance metrics associated with the first plurality of links of the WWA vRAN can also include load for the plurality of WWA RUs, the at least one DU, and the at least one CU.

At 204, the method may include, obtaining, by the NMS/path aware steering logic, second performance metrics associated with a second plurality of links for a WLA RAN in which the second plurality of links include a plurality of links between a plurality of WLA radio nodes (e.g., WLA APs 141.1-141.5) and a controller of the WLA RAN (e.g., WLC 142). As shown at 204a, the second performance metrics associated with the second plurality of links for the WLA RAN can include link utilization for the second plurality of links and packet loss for the second plurality of links. As shown at 204b, the second performance metrics associated with the second plurality of links for the WLA RAN can also include load for the plurality of WLA radio nodes and the controller of the WLA RAN.

At 206, the method may include, in response to determining that one of the WWA vRAN is experiencing degraded performance based on the first performance metrics or that the WLA RAN is experiencing degraded performance based on the second performance metrics, activating a steering event by the NMS/path aware steering logic that causes, at least in part, an indication to be communicated to a UE to cause the UE to connect to the WWA vRAN or to the WLA RAN that is not experiencing degraded performance.

Determining that one of the WWA vRAN is experiencing degraded performance or that the WLA RAN is experiencing degraded performance can include determining one of: that one or more of the first performance metrics satisfies one or more threshold levels to determine that the WWA vRAN is experiencing degraded performance (as shown at 206a); or that one or more of the second performance metrics satisfies one or more threshold levels to determine that the WLA RAN is experiencing degraded performance (as shown at 206b). The determining at 206 can be performed for one or more network locations (e.g., any of network locations 104.1-104.4) in order to activate WWA to WLA or WLA to WWA steering for one or more of the network locations. In various embodiments, threshold levels can include any numeric usage threshold levels, percent-based threshold levels, singular and/or multi-factor/multi-variable threshold levels (e.g., bandwidth/link utilization alone, considering latency in addition to bandwidth, considering jitter in combination with packet loss and link utilization/bandwidth, etc.), one or more threshold level ranges, combinations thereof, and/or the like that may be satisfied (e.g., met and/or exceeded, not met and/or not exceeded, combinations thereof, etc.), in order to determine whether one or more network locations of the WWA vRAN and/or the WLA RAN are or are not experiencing degraded performance such that one or more steering events can be activated or deactivated for the one or more network locations.

WWA vRAN to WLA RAN Steering Examples

With reference again to FIG. 1A, consider various example details involving WWA vRAN steering events that can be activated to facilitate WWA to WLA steering for one or more of UEs 102.1 and/or 102.2 and also various example details involving WLA RAN steering events that can be used to facilitate WLA to WWA steering for one or more of UEs 102.1 and/or 102.2 through various examples, discussed in further detail, below.

Various flow charts are illustrated with reference to FIGS. 3, 4, and 5 that illustrate various example details associated with various WWA vRAN steering events that can be activated and WWA vRAN steering event information 181 that can be sent to mobile core network 120/AMF 124 to facilitate WWA to WLA steering in accordance with embodiments herein.

One or more WWA vRAN steering event(s) may be activated by NMS 110/path aware steering logic 112 based on bandwidth pressure that may be determined for any of the fronthaul 134 links, midhaul 135 links, and/or backhaul 136 links and/or elements (e.g. RU load, DU load, CU load, and core load) involving mobile core network 120/WWA vRAN 130 in order to cause one or more of UEs 102.1 and/or 102.2 to connect to the WLA RAN 140. For example, due to certain hardware (e.g., FPGA) limitations, a DU may not be capable of processing beyond 20 Gigabits per second (Gbps) of user/UE throughput, such that satisfying this throughput limit may cause one or more WWA vRAN steering event(s) to be activated by NMS 110/path aware steering logic 112.

It is to be understood that various WWA steering events can be activated by NMS 110/path aware steering logic 112 and corresponding WWA vRAN steering event information 181 sent to mobile core network 120/AMF 124 for one or more network locations 104.1-104.4 to put the WWA vRAN 130 in a state of steering UEs 102.1 and/or 102.2 toward WLA RAN 140 and, conversely, can be deactivated or disabled to stop such steering. For example, WWA to WLA steering can be deactivated by NMS 110/path aware steering logic 112 upon determining that one or more threshold limit(s) are no longer satisfied for a given network location, based on metrics obtained from the WWA vRAN 130. It is to be understood that WWA to WLA steering and WWA to WLA steering can be local to the link/path where resources may be needed. Thus, WWA to WLA steering may be activated in one network location, while WLA to WWA steering may be activated in another network location. In this manner, steering can be dynamic based on network location and utilization of resources corresponding to each network location.

AMF 124 may be enhanced with AMF steering logic 125, such that the AMF 124 can consume WWA vRAN steering event information 181 obtained from NMS 110/path aware steering logic 112 for activated and/or deactivated steering events in order to enable WWA to WLA steering (for any activated WWA vRAN steering events) to cause one or more steering indications to be sent to one or more of UE 102.1 and/or 102.2 including UE steering metadata that facilitates WWA to WLA steering or disable WWA to WLA steering (for any deactivated WWA vRAN steering events), which may include not sending steering indications to UEs 102.1 and/or 102.2 or sending updated steering indications to UEs 102.1 and/or 102.2 including UE steering metadata that causes certain steering operations to be deactivated.

Various WWA vRAN steering events (e.g., event types) that can be used to steer one or more of UEs 102.1 and/or 102.2 to connect to the WLA RAN 140 can include any combination of: (1) new admission/initial registration steering events that can be triggered for UEs 102.1 and/or 102.2 that are attempting to register/connect with mobile core network 120 via a given RU 131; (2) existing UE steering events that can be triggered for UEs 102.1 and/or 102.2 that are currently registered/connected with mobile core network 120 and that are attempting to establish one or more new QoS/application flows; and/or 3) ATSSS steering events that can be triggered to adjust ATSSS traffic sharing rules according to available bandwidth in the mobile core network 120/WWA vRAN 130.

In various embodiments, selection of a given steering event type or types can be based on enterprise policy. For example, in at least one embodiment, an enterprise policy may be configured to enforce policy decisions based on priority. Typically, it is less desirable to impact existing sessions, so admitting a new flow/UE session can be considers a lower priority in comparison to moving an existing session to a different RAT type. Thus, in at least one embodiment, new admission/initial registration steering events may be configured to trigger for a first level of bandwidth pressure (e.g., a lower pressure) experienced for a given RAN/network paths/links (WWA or WLA) and existing UE steering events may be configured to trigger for a second level of bandwidth pressure (e.g., a higher pressure) experienced for a given RAN/network paths/links. It is to be understood that other event type configurations can be envisioned. For example, in some instances, more than two thresholds may be configured for different event types, different metric/performance issues (e.g., loss vs jitter vs delay) may be configured to trigger different event types, combinations thereof, and/or the like.

In at least one embodiment, network management/UE steering metadata that can be used for new admission/initial registration steering events and existing UE steering events can include WLA RAN available capacity (e.g., an indication that there is available WLA RAN capacity to handle traffic for one or more of UEs 102.1 and/or 102.2) and, in some instance, a list of neighbor WLA APs 141 to which one or more of UEs 102.1 and/or 102.2 can be steered for one or more network locations (e.g., RU<->WLA AP neighbor relations as configured for WWA/WLA neighbor relation data). In at least one embodiment, network management/UE steering metadata for ATSSS steering events can include newly adjusted ATSSS traffic sharing rules between the WWA vRAN 130 and the WLA RAN 140 (e.g., traffic split for UEs under normal conditions may include X % of traffic to the WWA vRAN 130 and Y % of traffic to the WLA RAN 140 and a traffic split for instances in which the WWA vRAN 130 is experiencing degraded performance may include (X−N) % of traffic to the WWA vRAN 130 and (Y+N) % of traffic to the WLA RAN 140).

Referring to FIG. 1B, FIG. 1B is a schematic diagram illustrating example details associated with WWA vRAN steering event information 181 (including network management/UE steering metadata) that can be communicated to mobile core network 120 and, in particular, AMF 124 for any activated/deactivated WWA to WLA steering event(s). Various WWA vRAN steering event information 181 can include event type information 181*a* for one or more steering event type(s) (e.g., Type 1: new admission/initial registration steering event, Type 2: existing UE steering event; and/or Type 3: ATSSS steering event) that may be activated or deactivated for WWA to WLA steering along with steering event metadata, such as, a WLA RAN available capacity indication 181*b* (e.g., indicating that there is available capacity in WLA RAN 140) and per-RU RU-to-WLA AP neighbor list(s) 181*c* for one or more of RU(s) 131.1, 131.2, 131.3, and/or 131.4 for one or more network locations 104.1, 104.2, 104.3, and 104.4 for which WWA to WLA steering is to be activated/deactivated. It is to be understood that additional and/or different WWA to WLA steering event types, indications, information, etc. can be envisioned.

In various embodiments, WWA vRAN steering event information 181 for a given type of WWA vRAN steering event (e.g., any combination of new admission/initial registration, existing UE session, ATSSS, etc.) along with any network management/UE steering metadata for a given type of steering event (e.g., indication of available WLA RAN capacity, list of neighbor WLA APs for each of RUs 131.1-131.4 for one or more corresponding network locations 104.1-104.4, etc.) can be communicated by the NMS 110/ path aware steering logic 112 to mobile core network 120 and, in particular AMF 124, using any bit, byte, flag, Information Element (IE), Attribute-Value Pair (AVP) object, combinations thereof, and/or the like that may be included in any Network Configuration Protocol (NETCONF), Application Programming Interface (API), Representational State Transfer (REST), Plug and Play (PnP) interface, Command-Line Interface (CLI) message and/or interface in order to activate WWA to WLA steering for system 100.

Different activated WWA vRAN steering events (event type(s)) and associated network management/UE steering metadata communicated to the AMF 124 via WWA vRAN steering event information 181 (based on determined performance degradation for the WWA vRAN 130 and available capacity in the WLA RAN 140) can trigger different indications to be provided to UEs 102.1 and/or 102.2 in order to cause one or more of UEs 102.1 and/or 102.2 to connect to the WLA RAN 140. As noted above, the network management/UE steering metadata sent to AMF 124 can include an indication that there is available capacity in the WLA RAN 140 and neighbor relation information for each of the RUs 131.1-131.4 indicating any of WLA APs 141.1, 141.2, 141.3, 141.4, and/or 141.5 that are neighbors of each of the RUs 131.1-131.4 for one or more corresponding network locations 104.1, 104.2, 104.3, and/or 104.4.

For example, new admission/initial registration steering events can be used to affect new UE registration with the mobile core network 120 such that WWA to WLA steering can be used to cause one or more of UEs 102.1 and/or 102.2 to connect to the WLA RAN 140 and can be performed through any combination of steering assistance that can be provided via the Non-Access Stratum (NAS) layer via an N1 NAS UE registration rejection message that can be sent to a given UE 102.1 or 102.2 that is attempting to register with the mobile core network 120 and/or can be provided via the RRC layer via RU 131 RRC broadcasts and/or an RRC rejection message sent to the given UE 102.1 or 102.2.

Regarding the NAS layer steering assistance, the AMF 124 can respond to a given UE 102.1 or 102.2 registration request with an N1 NAS UE registration reject message that includes a reject reason as bandwidth pressure in WWA vRAN 130 in one or more of the fronthaul 134, midhaul 135, and/or backhaul 136 links, which provides a steering indication to the given UE 102.1 or 102.2 that includes UE steering metadata to cause the given UE 102.1 or 102.2 to connect to the WLA RAN 140 rather than the WWA vRAN 130. The indication/UE steering metadata can include an indication that there is available capacity in the WLA RAN 140 and also a list of neighbor WLA APs 141 to which the given UE 102.1 or 102.2 can be steered for one or more corresponding network locations 104.1, 104.2, 104.3, and/or 104.4 at which the UEs are located.

Consider UE 102.1, for example, for an instance in which UE 102.1 is attempting to connect to RU 131.1 at a time when the WWA vRAN 130 is experiencing degraded performance and the new admission/initial registration steering event is activated for AMF 124. In this example, the steering indication sent to UE 102.1 at 183.1 that includes UE steering metadata to cause the UE 102.1 to steer to the WLA RAN 140 can be an N1 NAS UE Registration Reject message sent to the UE 102.1 from AMF 124 that includes UE steering metadata that identifies: a reject reason as bandwidth pressure/load for one or more of the fronthaul 134, midhaul 135, and/or backhaul 136 links; that there is available capacity in the WLA RAN 140; and also identifies WLA AP 141.1 and 141.2 as neighbors of RU 131.1 for network location 104.1, which can cause UE 102.1 to connect to one of WLA AP 141.1 or 141.2/WLC 142 for data transfer with data network(s) 160 via WLA RAN 140. In some instances, UE steering metadata for WWA to WLA steering events can further include an identifier for a UE, such as an International Mobile Subscriber Identity (IMSI), Subscription Permanent Identifier (SUPI), and/or the like that identifies the UE. In at least one embodiment, UE steering metadata may be carried in a new IE or the like for a NAS UE Registration Reject message.

Regarding the RRC broadcast steering assistance, the AMF 124, upon obtaining the new admission/initial registration steering event can provide a configuration update to the CU 133, which triggers each DU 132.1 and DU 132.2 and corresponding RUs 131.1-131.4 to start broadcasting over the air an indication of WWA vRAN 130 bandwidth pressure/load and/or load values for one or more of the fronthaul 134, midhaul 135, and/or backhaul 136 links and an indication that there is available capacity in the WLA RAN 140 in a System Information Block (SIB) broadcast. This can prevent new UEs from attaching to the WWA vRAN 130 and preferring the WLA RAN 140 instead. Additionally, for a given UE 102.1 or 102.2 that is attempting to connect to the WWA vRAN 130 in order to perform registration with the mobile core network 120, a given RU 131 can transmit an RRC reject message to the given UE 102.1 or 102.2 to steer the given UE 102.1 or 102.2 to the WLA RAN 140.

Consider UE 102.2, for example, in which UE 102.2 may be within the coverage of RU 131.3 and may receive a broadcast steering indication 183.2 from RU 131.3 that includes UE steering metadata indicating WWA vRAN 130 bandwidth pressure/load for the fronthaul 134. In this example, obtaining the broadcast steering indication including the UE steering metadata can trigger UE 102.2 to steer toward a connection with WLA RAN 140 and attempt to connect to a WLA AP within range, such as WLA AP 142.3/WLC 142, for data transfer with data network(s) 160 via WLA RAN 140.

Figure 3:
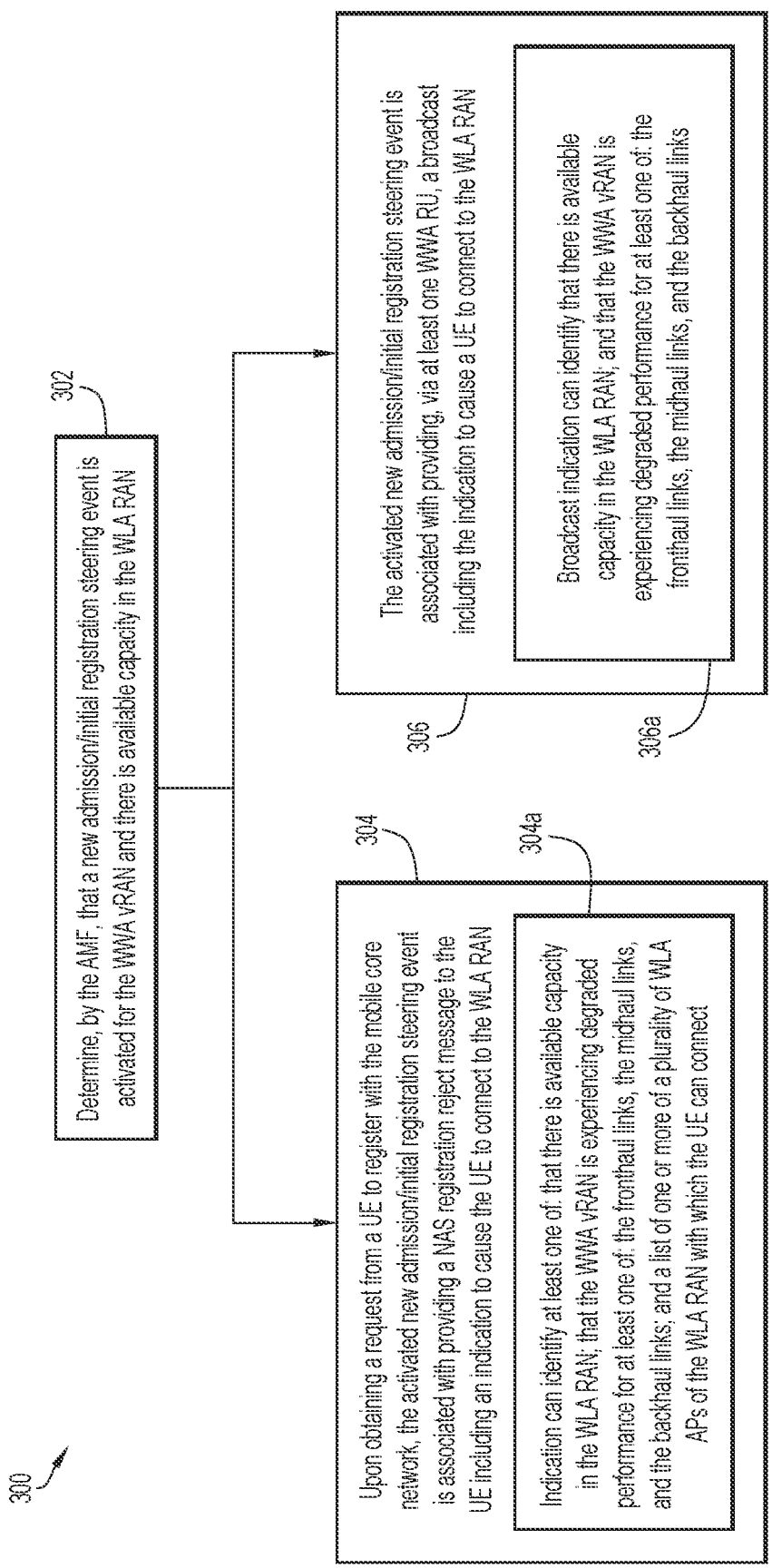
FIGS. 3, 4, and 5 are flow charts illustrating various example details associated with various WWA vRAN steering events that can be activated to facilitate WWA to WLA steering for one or more UE, in accordance with embodiments herein.

With reference to FIG. 3, FIG. 3 is a flow chart illustrating example details with a method 300 for utilizing a new admission/initial registration steering event to facilitate WWA to WLA steering, in accordance with at least one embodiment. In at least one embodiment, the method may be performed by an AMF, such as AMF 124 via AMF steering logic 125. At 302, the method can include the AMF 124 determining that a new admission/initial registration steering event is activated for the WWA vRAN 130 and that there is available capacity in the WLA RAN 140 (e.g., as activated by NMS 110/path aware steering logic 112 and communicated to AMF 124, along with network management/UE steering metadata for the activated event).

At 304, the method can include, upon obtaining a request from a given UE to register with the mobile core network, the activated new admission/initial registration steering event is associated with providing, by the AMF 124, a NAS registration reject message to the UE including an indication to cause the UE to connect to the WLA RAN 140. As shown at 304a, the indication can identify at least one of: that there is available capacity in the WLA RAN 140; that the WWA vRAN 130 is experiencing degraded performance for at least one of: the fronthaul 134 links, the midhaul 135 links, and the backhaul 136 links; and can identify a list of one or more of a plurality of WLA APs of the WLA RAN 140 (e.g., one or more neighboring WLA AP(s)) with which the UE can connect for a corresponding network location.

As shown at 306, the method can include that the activated new admission/initial registration steering event is associated with providing, via at least one WWA RU, a broadcast including the indication to cause a given UE to connect to the at WLA RAN 140. The indication can be included in a SIB broadcast by the at least one WWA RU. As shown at 306a, the broadcast can identify at least one of: that there is available capacity in the WLA RAN 140; and that the WWA vRAN 130 is experiencing degraded performance for at least one of: the fronthaul 134 links, the midhaul 135 links, and the backhaul 136 links.

Turning to existing UE steering events with reference to FIG. 1A, an existing UE steering event can be used to affect initiation of a new QoS flow by a given UE 102.1 or 102.2 such that WWA to WLA steering can be used to cause the given UE 102.1 or 102.2 to connect to the WLA RAN 140. Such steering can be performed by the AMF 124 by rejecting admission of a new QoS flow by the AMF 124 sending a NAS PDU Session Establishment Reject message to the given UE 102.1 or 102.2 in response to obtaining a NAS PDU Session Establishment Request message from the given UE. The NAS PDU Session Establishment Reject message can includes a reject reason as bandwidth pressure in WWA vRAN 130 in one or more of the fronthaul 134, midhaul 135, and/or backhaul 136 links, which provides a steering indication to the given UE 102.1 or 102.2 including UE steering metadata to cause the given UE 102.1 or 102.2 to connect to the WLA RAN 140. The UE steering metadata can include an indication that there is available capacity in the WLA RAN 140 and also a list of neighbor WLA APs 141 to which the given UE 102.1 or 102.2 can be steered for one or more corresponding network location(s) at which the UEs are located. In at least one embodiment, UE steering metadata may be carried in a new IE or the like for a PDU Session Establishment Reject message.

Consider UE 102.2, for example, for an instance in which UE 102.2 is registered/connected to the mobile core network 120 via RU 131.3 and attempts to initiate a new QoS flow (e.g., via a NAS PDU Session Establishment Request) at a time when the WWA vRAN 130 is experiencing degraded performance and the existing UE steering event is activated for AMF 124. In this example, the steering indication sent to UE 102.2 at 183.2 including UE steering metadata to cause the UE 102.2 to steer to the WLA RAN 140 can be a NAS PDU Session Establishment reject message sent to the UE 102.2 from AMF 124 including UE steering metadata that identifies: a reject reason as bandwidth pressure/load for one or more of the fronthaul 134, midhaul 135, and/or backhaul 136 links; that there is available capacity in the WLA RAN 140; and also identifies that WLA AP 141.4 as a neighbor of RU 131.3 for network location 104.3, which can cause UE 102.2 to connect to WLA AP 141.4/WLC 142 for data transfer with data network(s) 160 via WLA RAN 140.

Figure 4:
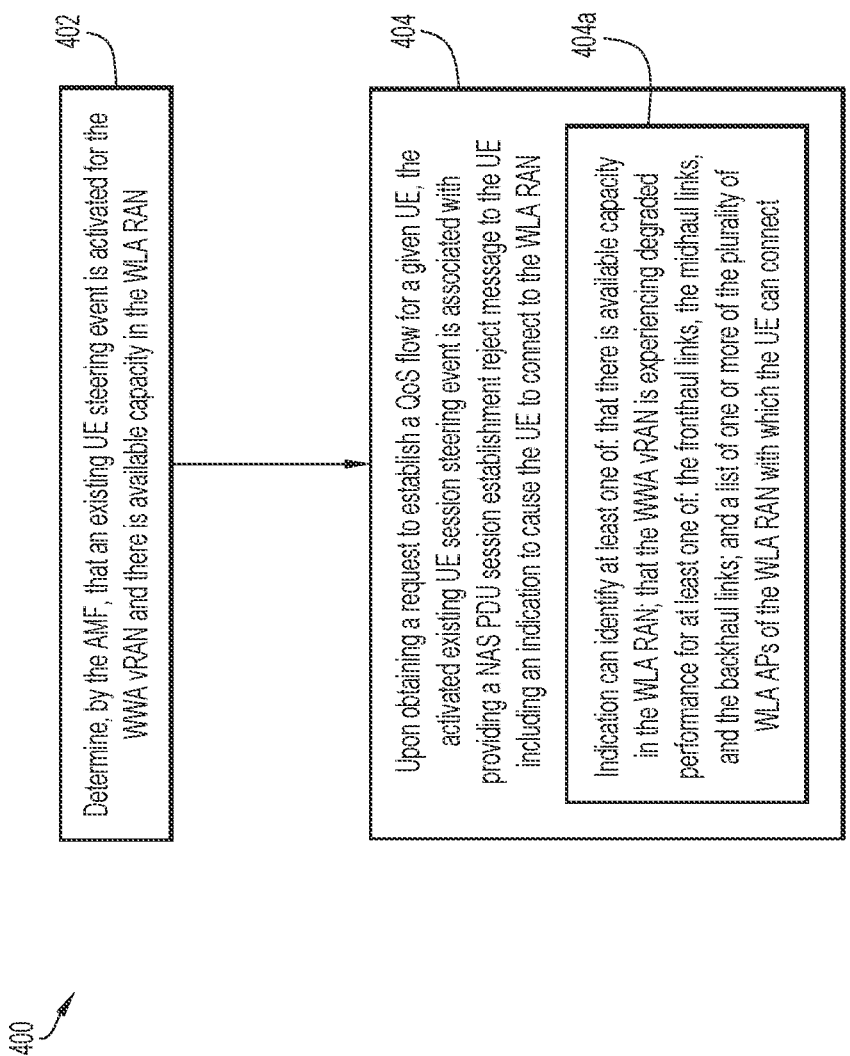

With reference to FIG. 4, FIG. 4 is a flow chart illustrating example details with a method 400 for utilizing an existing UE steering event to facilitate WWA to WLA steering, in accordance with at least one embodiment. In at least one embodiment, the method may be performed by an AMF, such as AMF 124 via AMF steering logic 125. At 402, the method can include the AMF 124 determining that a new admission/initial registration steering event is activated for the WWA vRAN and that there is available capacity in the WLA RAN (e.g., as activated by NMS 110/path aware steering logic 112 and communicated to AMF 124, along with network management/UE steering metadata for the activated event).

At 404, the method can include, upon obtaining a request to establish a QoS flow for a given UE (e.g., a NAS PDU Session Establishment Request message), the activated existing UE session steering event is associated with providing a NAS PDU session establishment reject message to the UE including a steering indication that includes UE steering metadata to cause the UE to connect to the WLA RAN 140. As shown at 404a, the indication/UE steering metadata can identify at least one of: that there is available capacity in the WLA RAN 140; that the WWA vRAN 130 is experiencing degraded performance for at least one of: the fronthaul 134 links, the midhaul 135 links, and the backhaul 136 links; and can identify a list of one or more of the plurality of WLA APs 141.1-141.5 of the WLA RAN 140 (e.g., neighboring WLA AP(s)) with which the UE can connect for a corresponding network location at which the UE is located.

As noted above regarding ATSSS steering events, ATSSS traffic sharing rules can be adjusted between the WWA vRAN 130 and the WLA RAN 140 and communicated to the AMF 124 and SMF 122 to be used to steer one or more of UEs 102.1 and/or 102.2 from the WWA vRAN 130 to the WLA RAN 140 in which network management/UE steering metadata for ATSSS steering events can include newly adjusted ATSSS traffic sharing rules between the WWA vRAN 130 and the WLA RAN 140. The AMF 124 can provide the ATSSS traffic sharing rules to SMF 122, which can enforce the rules during UE PDU session establishment.

Figure 5:
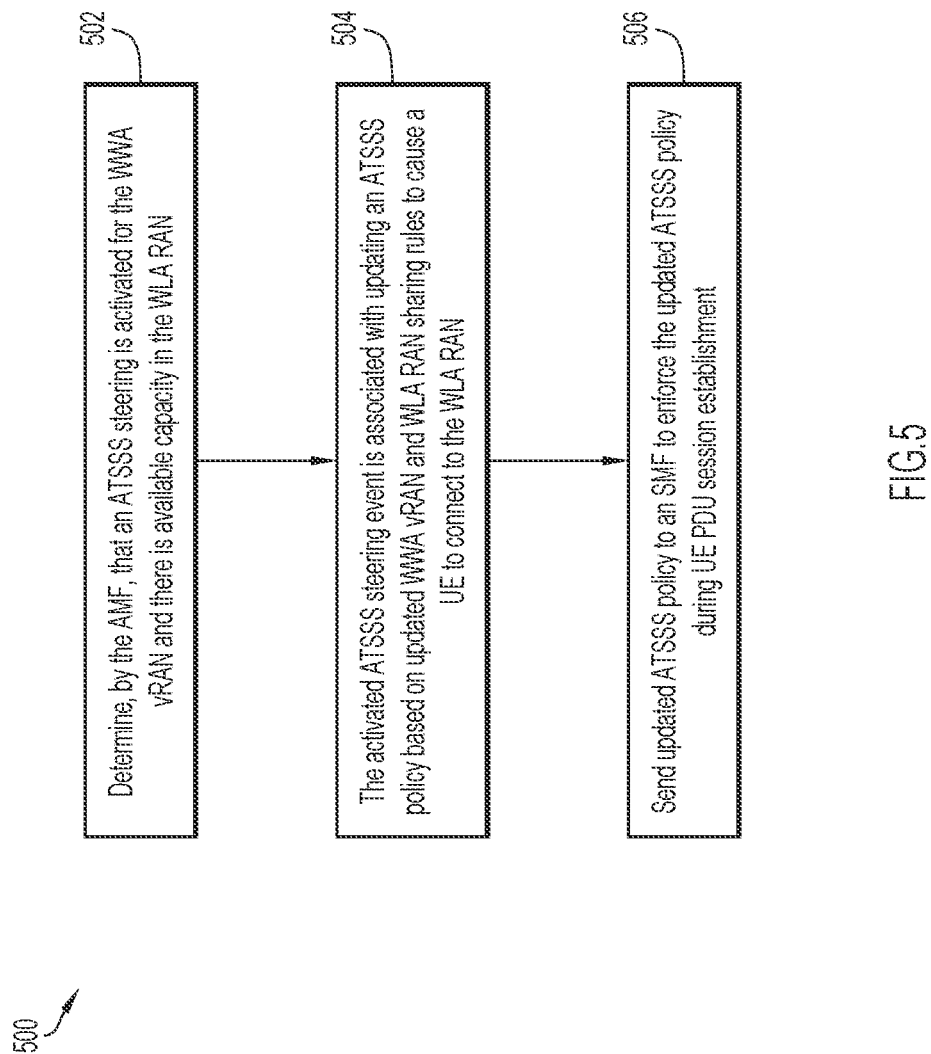

With reference to FIG. 5, FIG. 5 is a flow chart illustrating example details with a method 500 for utilizing an ATSSS steering event to facilitate WWA to WLA steering, in accordance with at least one embodiment. In at least one embodiment, the method may be performed by an AMF, such as AMF 124 via AMF steering logic 125, and SMF 122. At 502, the method can include the AMF 124 determining that an ATSSS steering event is activated for the WWA vRAN 40 and that there is available capacity in the WLA RAN 140 (e.g., as activated by NMS 110/path aware steering logic 112 and communicated to AMF 124, along with network management/UE steering metadata for the activated event). As shown at 504, the method can include that the activated ATSSS steering event is associated with updating an ATSSS policy based on updated ATSSS sharing rules to cause a given UE to connect to the WLA RAN 140. At 506, the method can include sending the updated ATSSS policy to the SMF to enforce the updated ATSSS policy during UE PDU session establishment.

WLA RAN to WWA vRAN Steering Examples

Various flow charts are illustrated with reference to FIGS. 6 and 7 that illustrate various example details associated with various WWA vRAN steering events that can be activated and WLA RAN steering event information 182 that can be sent to WLC 142 to facilitate WLA to WWA steering in accordance with embodiments herein.

Turning to the WLA RAN 140 for FIG. 1A, one or more WLA vRAN steering event(s) may be activated by NMS 110/path aware steering logic 112 based on bandwidth pressure that may be determined for any of the WLA AP-WLC backhaul links and/or WLC 142 in order to cause one or more UEs 102.1 and/or 102.2 to connect to the WWA vRAN 130. WLC 142 may be enhanced with WLC steering logic 143, such that the WLC steering logic 143 can consume WLA RAN steering event information 182 obtained from NMS 110/path aware steering logic 112 for activated and/or deactivated steering events in order to enable WLA to WWA steering (for any activated WLA RAN steering events) to cause one or more steering indications to be sent to one or more of UE 102.1 and/or 102.2 including UE steering metadata to facilitate WLA to WWA steering or to disable WLA to WWA steering (for any deactivated WLA RAN steering events), which may include not sending steering indications to UEs 102.1 and/or 102.2 or sending updated steering indications to UEs 102.1 and/or 102.2 including UE steering metadata that causes certain steering operations to be deactivated.

Upon determining any combination of, an increase in available bandwidth/capacity in the WWA vRAN 130 or, more generally, available bandwidth/capacity in the WWA vRAN 130 (i.e., not limited to only an "increase" in available capacity in the WWA vRAN 130 but also inclusive of available capacity), deterioration in one or more WLA AP-WLC links (e.g., WLA backhaul links) in comparison to one or more link threshold levels, satisfying (e.g., meeting or exceeding) one or more threshold(s) involving load of one or more WLA APs 141.1-141.5, and/or satisfying one or more threshold(s) involving WLC 142 load, the NMS 110/path aware steering logic 112 can activate one or more WLA RAN steering events and send corresponding WLA RAN steering event information 182 to put the WLC 142 in a state of steering one or more of UEs 102.1 and/or 102.2 toward WWA vRAN 130. In some embodiments, WLA RAN steering event information 182 sent to WLC 142 can include network management/UE steering metadata, such as in indication of available capacity in the WWA vRAN 130 and neighbor relation information for each of the WLA APs 141.1-141.5 indicating any of RUs 131.1, 131.2, 131.3, and/or 131.4 that are neighbors of each of the WLA APs 141.1-141.5 for one or more corresponding network locations 104.1, 104.2, 104.3, and/or 104.4.

Various WLA RAN steering events/steering event information 182 that can be used to steer one or more of UEs 102.1 and/or 102.2 to connect to the WWA vRAN 130 can include any combination of: (1) initial 802.11 (e.g., Wi-Fi) association steering events in which WLC 142 can trigger WLA to WWA steering for new UEs attempting Wi-Fi association with WLA RAN 140 and/or (2) existing UE steering events in which WLC 142 can trigger WLA to WWA steering upon detection of a bandwidth hungry (e.g., high bandwidth) application being initiated by one or more of UEs 102.1 and/or 102.2. Generally, Wi-Fi association for a UE involves 802.11 authentication and then Wi-Fi association with a given WLA AP 141/WLC 142, following which data transfer can begin, unless an 802.1X authentication is to be performed, which can then be performed following Wi-Fi association via WLC 142.

Referring to FIG. 1C, FIG. 1C is a schematic diagram illustrating example details associated with an example message format that can be utilized for communicating WLA RAN steering event information 182 (including network management/UE steering metadata) to WLC 142 for any activated/deactivated WLA to WWA steering event(s). Various WLA RAN steering event information 182 can include event type information 182*a* for one or more steering event type(s) that may be activated or deactivated for WLA to WWA steering (e.g., Type 1: initial Wi-Fi association steering event and/or Type 2: existing UE steering event) along with steering event metadata, such as, a WWA vRAN available capacity indication 182*b* (e.g., indicating that there is available capacity in WWA vRAN 130) and per-WLA AP WLA AP-to-RU neighbor list(s) 182*c* for one or more of WLA AP(s) 141.1, 141.2, 141.3, 141.4, and/or 141.5 for one or more corresponding network locations 104.1, 104.2, 104.3, and/or 104.4 for which WLA to WWA steering is to be activated/deactivated. It is to be understood that additional and/or different WLA to WWA steering event types, indications, information, etc. can be envisioned.

In various embodiments, WLA RAN steering event information 182 for a given type of WLA RAN steering event (e.g., initial Wi-Fi association steering event or existing UE steering event) along with any network management/UE steering metadata for a given type of steering event (e.g., indication of available WWA vRAN capacity, list of neighbor RUs for each of WLA APs 141.1-141.5, etc. for one or more corresponding network locations) can be communicated by the NMS 110/path aware steering logic 112 to WLC 142, using any bit, byte, flag, IE, AVP object, combinations thereof, and/or the like that may be included in any NETCONF, API, REST, CLI message and/or interface message to activate WLA to WWA steering.

The different WLA steering events (event types) and associated network management/UE steering metadata communicated to the WLC 142 via WLA RAN steering event information 182 (based on determined performance degradation for the WLA RAN 140 and available capacity for WWA vRAN 130) can trigger different indications to be provided to UEs 102.1 and/or 102.2 in order to cause one or more of UEs 102.1 and/or 102.2 to connect to the WWA vRAN 130. In various embodiments, selection of a given steering event type or types can be based on enterprise policy.

For example, initial Wi-Fi association steering events can be used to affect new UE Wi-Fi association with WLA RAN 140 such that WLA to WWA steering can be used to trigger hard steering in which WLC 142 can respond to an Wi-Fi Association Request message from a given UE 102.1 and/or 102.2 with an Wi-Fi Association Response reject that includes a reason indicating bandwidth pressure in the WLC-WLA AP backhaul link, which provides a steering indication to the given UE 102.1 and/or 102.2 including UE steering metadata to cause the given UE 102.1 and/or 102.2 to connect to the WWA vRAN 130 rather than the WLA RAN 140. The UE steering metadata can include an indication that there is available capacity in the WWA vRAN 10 and also a list of neighbor WLA APs 141 to which the given UE 102.1 or 102.2 can be steered for one or more corresponding network locations. In some instances, UE steering metadata for WLA to WWA steering events can further include an identifier for a UE, such as a Network Address Identifier (NAI), Media Access Control (MAC) address, and/or the like that identifies the UE.

Consider UE 102.1, for example, for an instance in which UE 102.1 is attempting to perform a Wi-Fi association with WLA AP 141.2 at a time when the WLA RAN 140 is experiencing degraded performance and the Wi-Fi association steering event is activated for WLC 142. In this example, the steering indication sent to UE 102.1 at 184.1 including UE steering metadata to cause the UE 102.1 to steer to the WWA vRAN 130 can be an Wi-Fi Association Response reject message sent to the UE 102.1 from WLC 142 including UE steering metadata that identifies: a reject reason as bandwidth pressure/load for the WLC-WLA AP backhaul link; that there is available capacity in the WWA vRAN 130; and also identifies RU 131.1 as a neighbor of WLA 141.2 for network location 104.1, which can cause UE 102.1 to connect to RU 131.1/mobile core network 120 for data transfer with data network(s) 160.

In another example, initial 802.11 steering events can be used to affect new UE Wi-Fi association attempts with WLA RAN 140 via broadcast steering assistance in which WLC 142 can configure WLA APs 141.1-141.5 to broadcast, a broadcast steering indication including UE steering metadata indicating that the WWA vRAN 130 access is the preferred access, as the WLA RAN 140 is experiencing degraded performance (e.g., bandwidth pressure) and that there is available capacity in the WWA vRAN 130. Such a broadcast steering indication can result in steering UEs 102.1 and/or 102.2 to connect to the WWA vRAN 130. In various embodiments, such a broadcast steering indication/UE steering metadata could be provided via a QoS Enhanced Basic Service Set (QBSS) Information Element (IE) that can be included in any combination of 802.11 beacons, probe responses, and/or Access Network Query Protocol (ANQP) responses.

Consider UE 102.2, for example, in which UE 102.2 may be within the coverage of WLA AP 141.2 and may receive a broadcast steering indication 184.2 transmitted by WLA AP 141.2 that includes UE steering metadata including an indication of WLA RAN 140 bandwidth pressure/load within a QBSS IE of an 802.11 beacon transmitted by WLA AP 141.2. In this example, obtaining the broadcast steering indication/UE steering metadata can trigger UE 102.2 to steer toward a connection with WWA vRAN 130 and attempt to connect to an RU within range, such as RU 131.3, for data transfer with data network(s) 160 via WWA vRAN 130/mobile core network 120.

Figure 6:
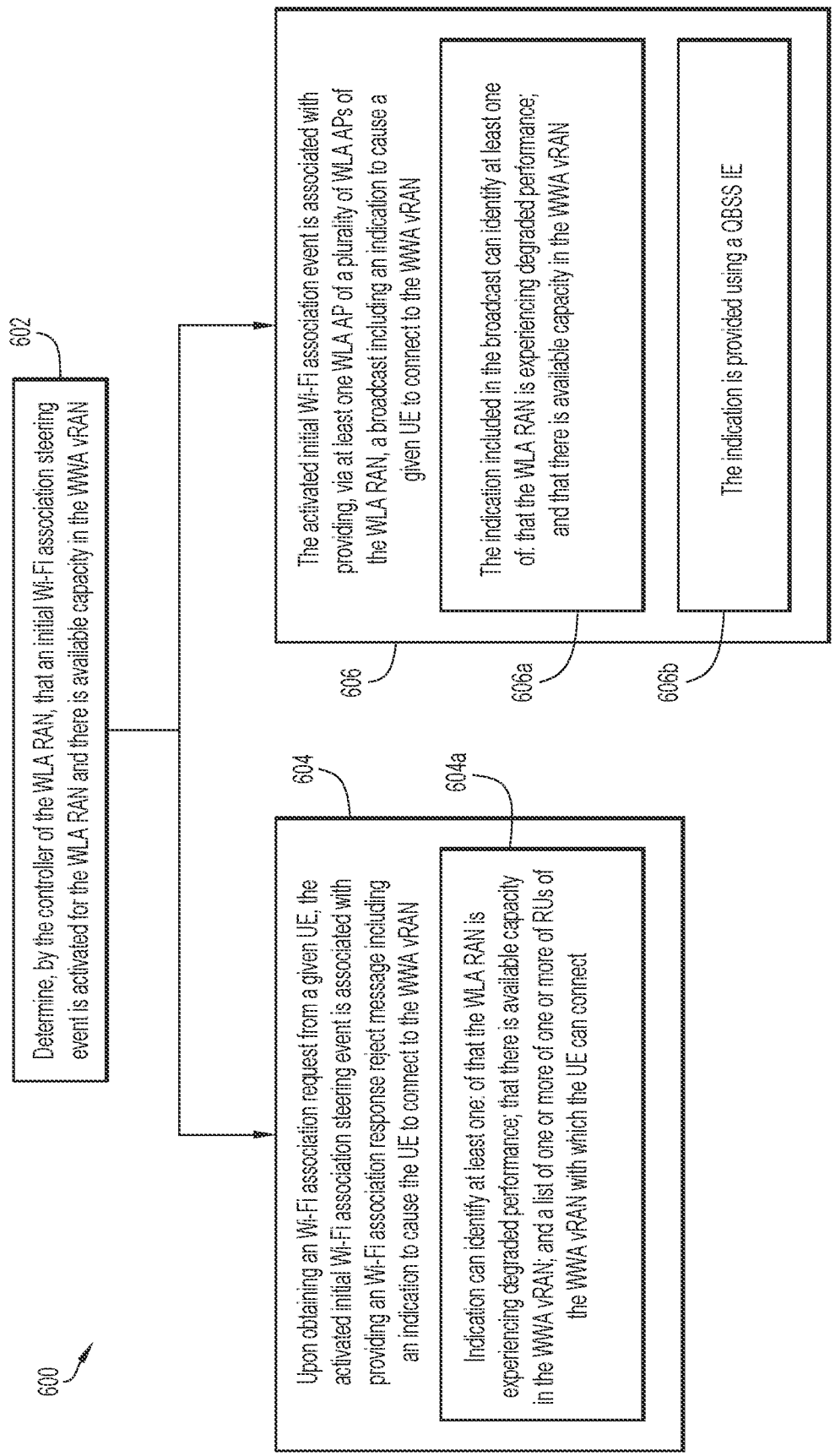
FIGS. 6 and 7 are flow charts illustrating example details associated with various WLA RAN steering events that can be activated to facilitate WLA to WWA steering for one or more UE, according to an example embodiment.

With reference to FIG. 6, FIG. 6 is a flow chart illustrating example details with a method 600 for utilizing an initial Wi-Fi association steering event to facilitate WLA to WWA steering, in accordance with at least one embodiment. In at least one embodiment, the method may be performed by a controller for the WLA RAN 140, such as WLC 142 via WLC steering logic 143. At 602, the method can include the WLC 142 determining that an initial 802.11 steering event is activated for the WLA RAN 140 and that there is available capacity in the WWA vRAN 130 (e.g., as activated by NMS 110/path aware steering logic 112 and communicated to WLC 142, along with network management/UE steering metadata for the activated event).

At 604, the method can include, upon obtaining a Wi-Fi (e.g., 802.11) association request from a given UE, the activated initial Wi-Fi association steering event is associated with providing an Wi-Fi association response reject message including an indication to cause the UE to connect to the WWA vRAN 130. As shown at 604a, the indication can identify at least one of: that the WLA RAN 140 is experiencing degraded performance; that there is available capacity in the WWA vRAN 130; and a list of one or more of one or more of RUs 131.1-131.4 of the WWA vRAN 130 (e.g., neighboring RU(s) for one or more corresponding network locations) with which the UE can connect.

As shown at 606, the method can include that the activated initial Wi-Fi association event is associated with providing, via at least one WLA AP of the plurality of WLA APs 141.1-141.5 of the WLA RAN 140, a broadcast including an indication to cause a given UE to connect to the WWA vRAN 130. As shown at 606a, the indication included in the broadcast can identify at least one of that the WLA RAN 140 is experiencing degraded performance, and/or that there is available capacity in the WWA vRAN 130. In at least one embodiment, the indication is provided in the broadcast using a QBSS IE, as shown at 606b.

Turning to existing UE steering events with reference to FIG. 1A, an existing UE steering event can cause WLC 142 to trigger WLA to WWA steering upon detection of a bandwidth hungry application being initiated by a given UE 102.1 and/or 102.2 that is currently connected to the WLA RAN 140 to cause the given UE 102.1 and/or 102.2 to steer to the WWA vRAN 130. Such steering can be initiated by WLC 142 when the WLC 142 detects that a given UE 102.1 and/or 102.2 starts a high bandwidth application. In various embodiments, WLC 142 can be configured with a list of potential high bandwidth applications, can receive a list of high bandwidth applications as network management/UE steering metadata from NMS 110/path aware steering logic 112, combinations thereof, and/or the like in order to identify when a high bandwidth application is initiated by a given UE 102.1 and/or 102.2. In various embodiments, applications may be identified by WLC 142 using any combination of an Application Detection Function (ADF), Traffic Detection Function (TDF), Deep Packet Inspection (DPI), Cisco® Network Based Application Recognition (NBAR), NBAR2, and/or other similar functionality/logic as may be understood in the art for detecting/identifying applications/application types.

Upon detection of a high bandwidth application being initiated by a given UE 102.1 and/or 102.2, WLC 142 can initiate hard steering to steer the given UE 102.1 and/or 102.2 to connect to the WWA vRAN 130. The WLC 142 may utilize multiple arsenals to send a steering indication including UE steering metadata. In various embodiments, WLC 142 can send any of an 802.11 Dissociation Response, an Action Frame, and/or a Basic Service Set (BSS) Transition Management Frame (BTM) Frame to the given UE 102.1 and/or 102.2 that includes UE steering metadata such as a reason indicating bandwidth pressure in the WLC-WLA AP backhaul link, which provides a steering indication to the given UE 102.1 and/or 102.2 to cause the given UE 102.1 and/or 102.2 to connect to the WWA vRAN 130. The UE steering metadata can further include an indication that there is available capacity in the WWA vRAN 10 and also a list of neighbor WLA APs 141 to which the given UE 102.1 or 102.2 can be steered for one or more corresponding network locations.

Consider UE 102.2, for example, for an instance in which UE 102.2 is associated/connected to the WLA RAN 140 via WLA AP 141.4 and attempts to start a flow for a high-bandwidth application at a time when the WWA vRAN 130 is experiencing degraded performance and the existing UE steering event is activated for WLC 142. In this example, the steering indication sent to UE 102.2 at 184.2 to cause the UE 102.2 to steer to the WWA vRAN 130 can be any of an 802.11 Dissociation Response, an Action Frame, and/or a BTM Frame sent to the UE 102.2 that includes UE steering metadata that identifies that a reason indicating bandwidth pressure in the WLC-WLA AP backhaul link, that there is available capacity in the WWA vRAN 130, and also identifies RU 131.3 as a neighbor of WLA 141.4 for network location 104.3, which can cause UE 102.2 to connect to RU 131.3/mobile core network 120 for data transfer with data network(s) 160 via WWA vRAN 130.

Figure 7:
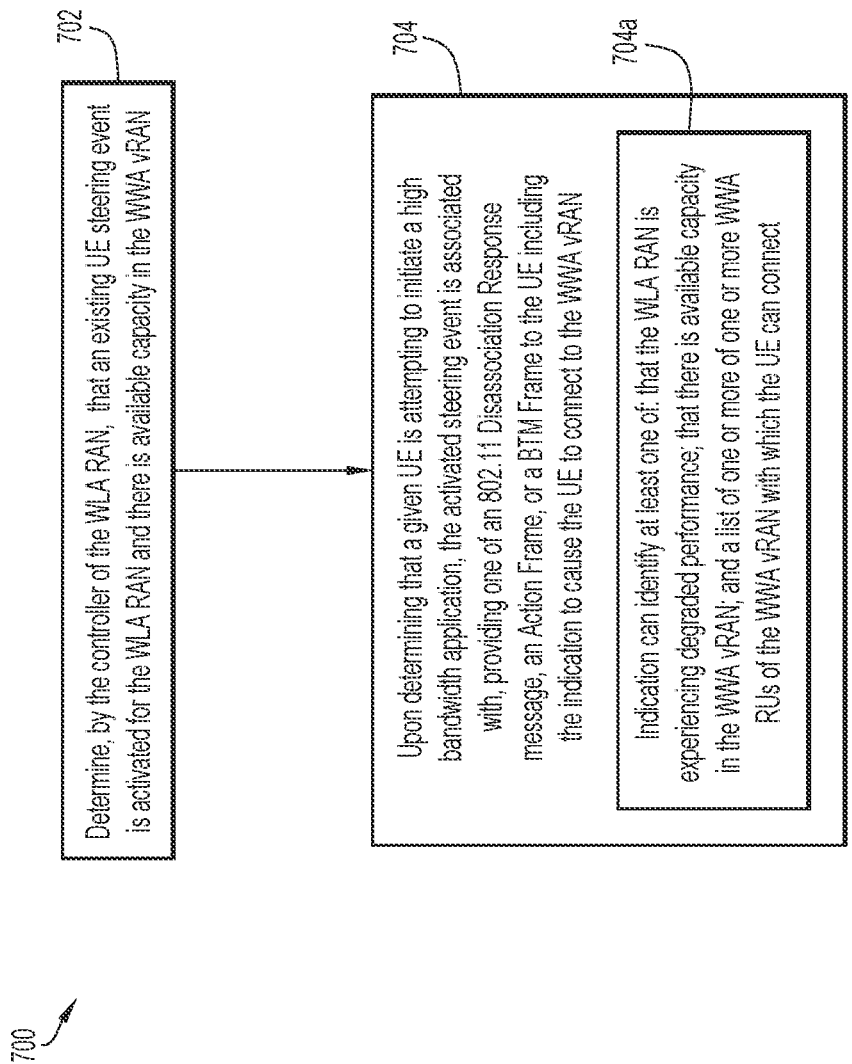

With reference to FIG. 7, FIG. 7 is a flow chart illustrating example details with a method 700 for utilizing an existing UE steering event to facilitate WLA to WWA steering, in accordance with at least one embodiment. In at least one embodiment, the method may be performed by a controller of the WLA RAN 140, such as WLC 142 via WLC steering logic 143. At 702, the method can include the WLC 142 determining that an existing UE steering event is activated for the WWA vRAN and that there is available capacity in the WWA vRAN (e.g., as activated by NMS 110/path aware steering logic 112 and communicated to WLC 142, along with network management/UE steering metadata for the activated event).

At 704, the method can include, upon determining that a given UE is attempting to initiate a high bandwidth application, the activated steering event is associated with, providing one of an 802.11 Disassociation Response message, an Action Frame, or a BTM Frame to the UE including the indication to cause the UE to connect to the WWA vRAN 130. As shown at 704*a*, the indication can identify at least one of: that the WLA RAN is experiencing degraded performance; that there is available capacity in the WWA vRAN; and a list of one or more of one or more of the plurality of RUs 131.1-131.5 of the WWA vRAN 130 with which the UE can connect.

Figure 8:
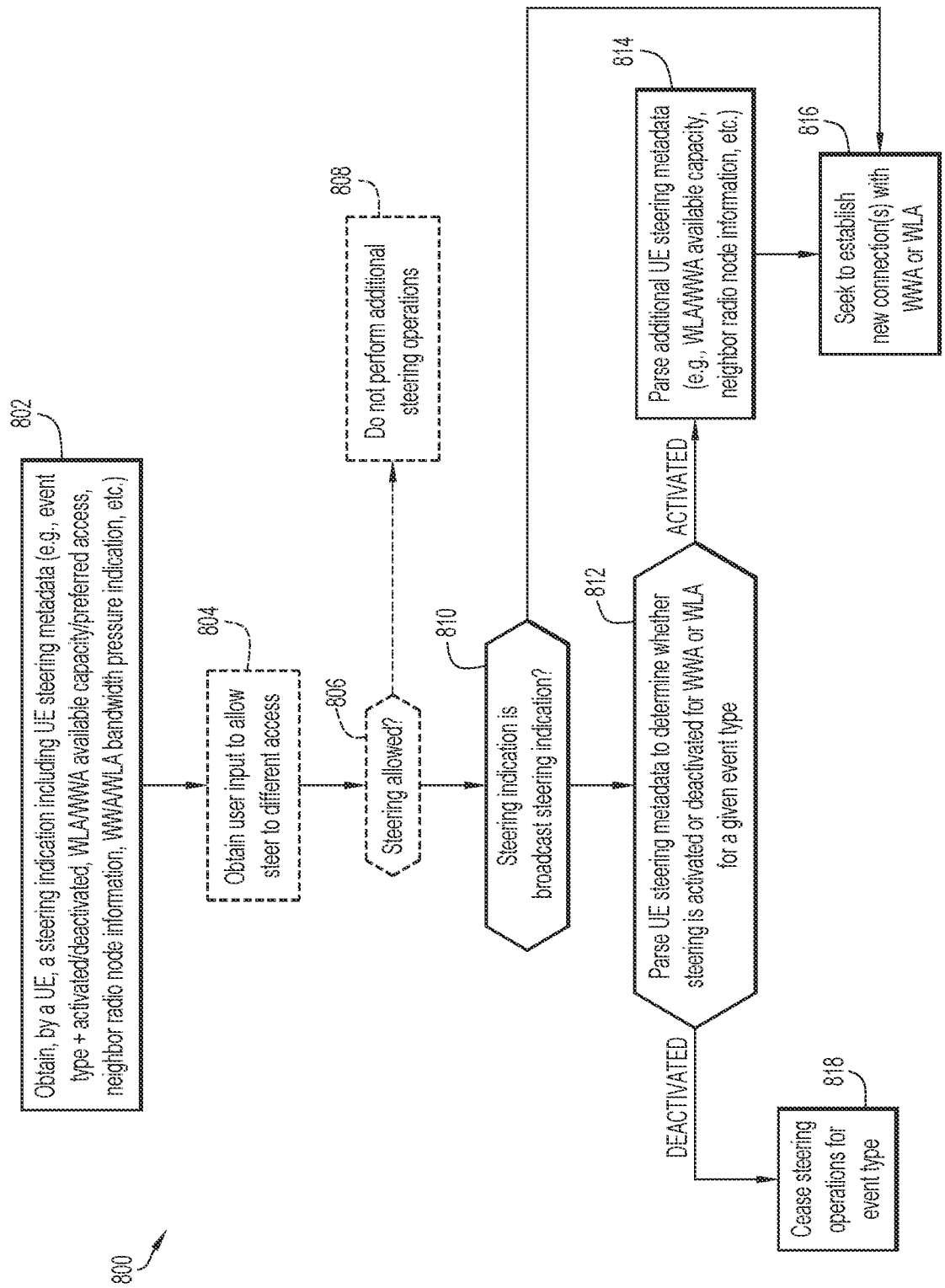
FIG. 8 is a flow chart depicting a method associated with UE steering operations that may be performed by a UE for one or more steering events, according to an example embodiment.

Referring to FIG. 8, FIG. 8 is a flow chart depicting a method 800 associated with UE steering operations that may be performed by a UE for one or more steering events, according to an example embodiment. In at least one embodiment, method 800 maybe performed by UE 102.1 or UE 102.2 via connectivity management logic configured for the UE in accordance with embodiments herein.

At 802, the method may include the UE obtaining a steering indication at a given network location from a radio node (e.g., a WWA radio node, such as an RU, or a WLA radio node, such as a WLA AP) including UE steering metadata. The steering indication can be a broadcast steering indication obtained by the UE or a steering indication obtained by the UE in response to some action requested or initiated by the UE or an application on behalf of the UE (e.g., a new WWA registration/connection request, a PDU session establishment request for a new WWA QoS flow, Wi-Fi association, detection of a new application flow for a Wi-Fi connection, etc.). The UE steering metadata can include any combination of an indication of an event type along with an indication of the event type being activated or deactivated, an indication the WLA RAN or the WWA vRAN having available capacity or being a preferred access, neighbor radio node information, an indication of WWA vRAN 130 or WLA RAN 140 bandwidth pressure, and/or any other metadata discussed and/or envisioned herein.

In at least one embodiment, as shown at 804, the method can include the UE obtaining a user input as to whether to allow the UE to steer to a different access. For example, a user interface (UI) prompt could be provided to the user of the UE to select whether to allow or not allow steering, such that the user/UE may experience degraded performance by not allowing the steering. In such an embodiment, as shown at 806, method can include the UE determining the user input and if steering is allowed (YES at 806), the method can include performing additional steering operations at 810, 812, 814, 816 and/or 818 (as appropriate), as discussed below. However, if the UE determines that steering is not allowed (NO at 806), the method may include the UE not performing additional steering operations, as shown at 808, which may cause the UE to experience degraded performance.

Continuing to 810 (e.g., if steering is determined to be allowed by the user in some embodiments, as shown at 806, or if automatically proceeding from 802 to 810 in some embodiments), the method can include the UE determining if the steering indication is a broadcast steering indication obtained by the UE (e.g., obtained via a WWA SIB broadcast or obtained via any combination of 802.11 beacons, probe responses, ANQP responses, etc.). Upon determining at 810 that the steering indication is a broadcast steering indication (YES at 810), the method can proceed to 816 at which the UE can seek to establish any new connection(s) using a preferred access indicated in the broadcast indication (e.g., to establish a WWA vRAN connection if the broadcast is obtained from a WLA AP or to establish a WLA RAN connection if the broadcast is obtained from a WWA RU).

Returning to 810, if the UE determines that the steering is not a broadcast steering indication (NO at 810), the method can continue to 812 at which the UE can parse the UE steering metadata from the steering indication do determine whether steering is activated or deactivated for the WWA vRAN 130 or the WLA RAN 140 for a given event type. Upon determining at 812 that steering for a particular event type is deactivated (DEACTIVATED at 812), the method can continue to 818 at which the UE can cease steering operations for the given event type.

However, upon determining at 812 that steering for a particular event type is activated (ACTIVATED at 812), the method can include the UE parsing additional UE steering metadata from the steering indication at 814 to determine whether there is an indication of WWA vRAN 130 or WLA RAN 140 available capacity and determine potential neighbor radio node(s) for a given access type and, at 816, the UE can seek to establish any new connection(s) using the neighbor radio node information for the access to which the UE is to steer for any new connection(s).

Accordingly, system 100 may provide for the ability to facilitate UE steering across WWA vRAN 130 and WLA RAN 140 based on path/link awareness for various fronthaul, midhaul, and or backhaul links for the WWA and WLA access networks as well as element awareness for various elements provided along the various paths/links in accordance with embodiments herein.

Figure 9:
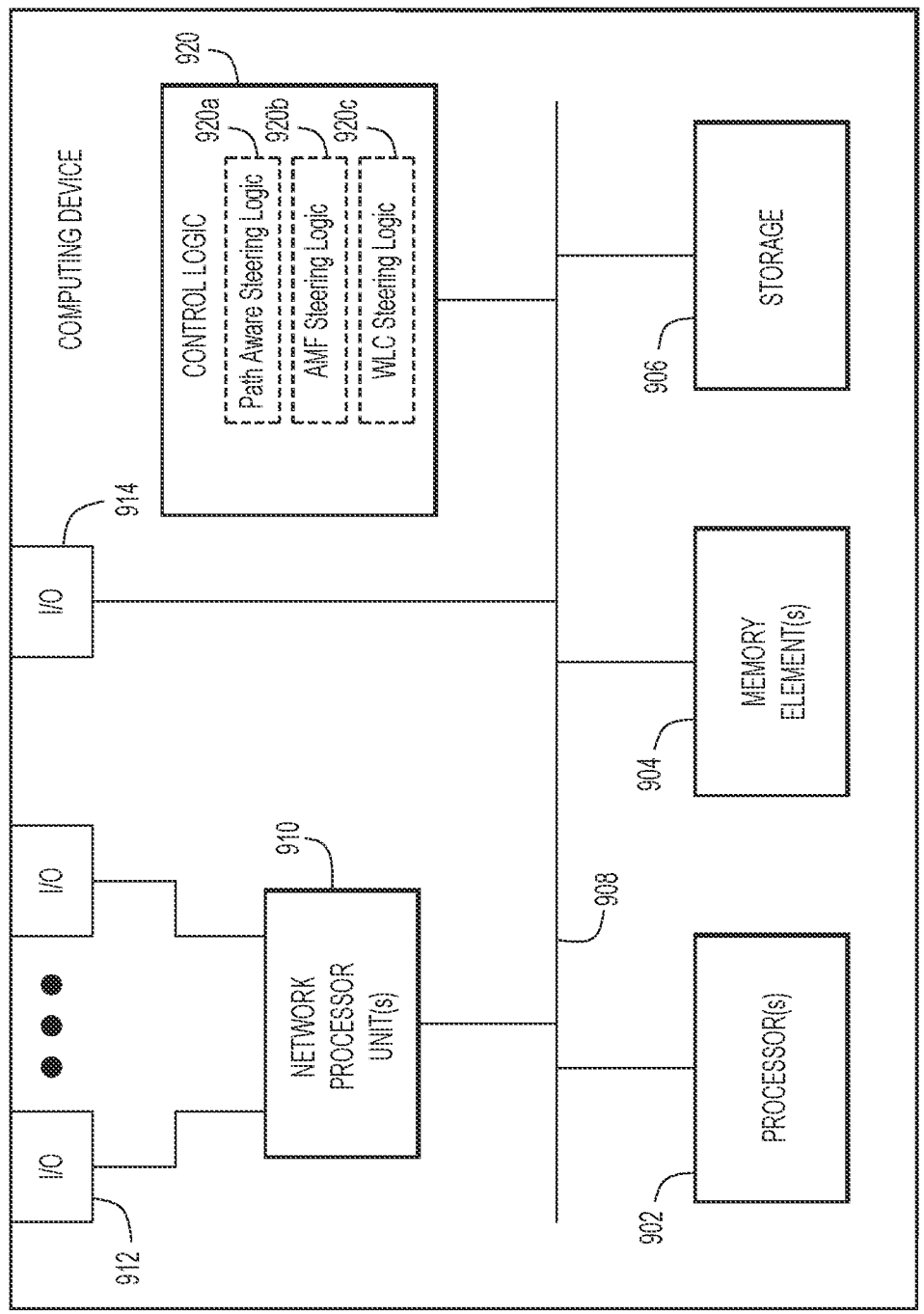
FIG. 9 is a hardware block diagram of a computing device that may perform functions associated with any combination of operations, in connection with the techniques discussed herein.

Referring to FIG. 9, FIG. 9 illustrates a hardware block diagram of a computing device 900 that may perform functions associated with operations discussed herein. In various embodiments, a computing device or apparatus, such as computing device 900 or any combination of computing devices 900, may be configured as any entity/entities as discussed herein in order to perform operations of the various techniques discussed herein, such as, for example, any of NMS 110, AMF 124, SMF 122, UPF 126, CU 133, DU 132.1, DU 132.2, WLC 142, any of R/S 151.1-151.14, and/or any other network element discussed for embodiments herein.

In at least one embodiment, computing device 900 may be any apparatus that may include one or more processor(s) 902, one or more memory element(s) 904, storage 906, a bus 808, one or more network processor unit(s) 910 interconnected with one or more network input/output (I/O) interface(s) 912, one or more I/O interface(s) 914, and control logic 920. For embodiments in which computing device 900 may be implemented as an NMS, such as NMS 110, control logic 920 may further be configured with path aware steering logic 920*a*, which may facilitate various steering operations as discussed herein with reference to NMS 110/path aware steering logic 112. For embodiments in which computing device 900 may be implemented as an AMF, such as AMF 124, control logic 920 may further be configured with AMF steering logic 920*b*, which may facilitate various WWA to WLA steering operations as discussed herein with reference to AMF 124/AMF steering logic 125. For embodiments in which computing device 900 may be implemented as a WLC, such as WLC 142, control logic 920 may further be configured with WLC steering logic 920*c*, which may facilitate various WLA to WWA steering operations as discussed herein with reference to WLC 142/WLC steering logic 143.

In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device. Processor(s) 902 (e.g., hardware processor(s)) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communications (wired and/or wireless) between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, and/or any other I/O port(s) and/or antennas/antenna arrays now known or hereafter developed. Thus, the network processor unit(s) 910 and/or network I/O interface(s) 912 may include suitable interfaces for receiving, transmitting, and/or otherwise communicating (in a wired and/or wireless manner) data and/or information in a network environment.

I/O interface(s) 914 allow for input and output of data and/or information with other entities that may be connected to computer device 900. For example, I/O interface(s) 914 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform various operations which can include, but not be limited to, providing overall control operations of computing device 900; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For embodiments in which computing device 900 may be implemented as an NMS, such as NMS 110, control logic 920 in combination with path aware steering logic 920a can include instructions that, when executed, cause processor(s) 902 to perform operations including, but not limited to obtaining first performance metrics associated with a first plurality of links of a WWA vRAN in which the first plurality of links include fronthaul links interconnecting at plurality of WWA radio units and at least one distributed unit, midhaul links interconnecting the at least one distributed unit and at least one central unit, and one or more backhaul links interconnecting the at least one central unit and a mobile core network; obtaining second performance metrics for a second plurality of links for a WLA RAN in which the second plurality of links include a plurality of communication links between a plurality of WLA radio nodes and a controller of the WLA RAN; and in response to determining that one of the WWA vRAN is experiencing degraded performance based on the first performance metrics or the WLA RAN the second performance metrics, activating a steering event that causes, at least in part, an indication to be communicated to a UE to cause the UE to connect to the WWA vRAN or the WLA RAN that is not experiencing degraded performance.

For embodiments in which computing device may be implemented as an AMF, such as AMF 124, control logic 920 in combination with AMF steering logic 920b can include instructions that, when executed, cause processor(s) 902 to perform operations including obtaining WWA vRAN steering event information for one or more activated WWA to WLA steering events and, at least in part, providing one or more steering indications including UE steering metadata to one or more UE(s) (including broadcast steering indications), updating an ATSSS policy based on one or more updated ATSSS sharing rules for one or more activated steering event(s) to cause the UE(s) to connect to the WLA RAN, combinations thereof, and/or any other operations as discussed herein For embodiments in which computing device 900 may be implemented as a WLC, such as WLC 142, control logic 920 in combination with WLC steering logic 920c can include instructions that, when executed, cause processor(s) 902 to perform operations including obtaining WLA RAN steering event information for one or more activated WLA to WWA steering events and providing one or more steering indications including UE steering metadata to one or more UE(s)

(including broadcast steering indications) for one or more steering event(s) to cause the UE(s) to connect to the WWA vRAN, combinations thereof, and/or any other operations as discussed herein.

Figure 10:
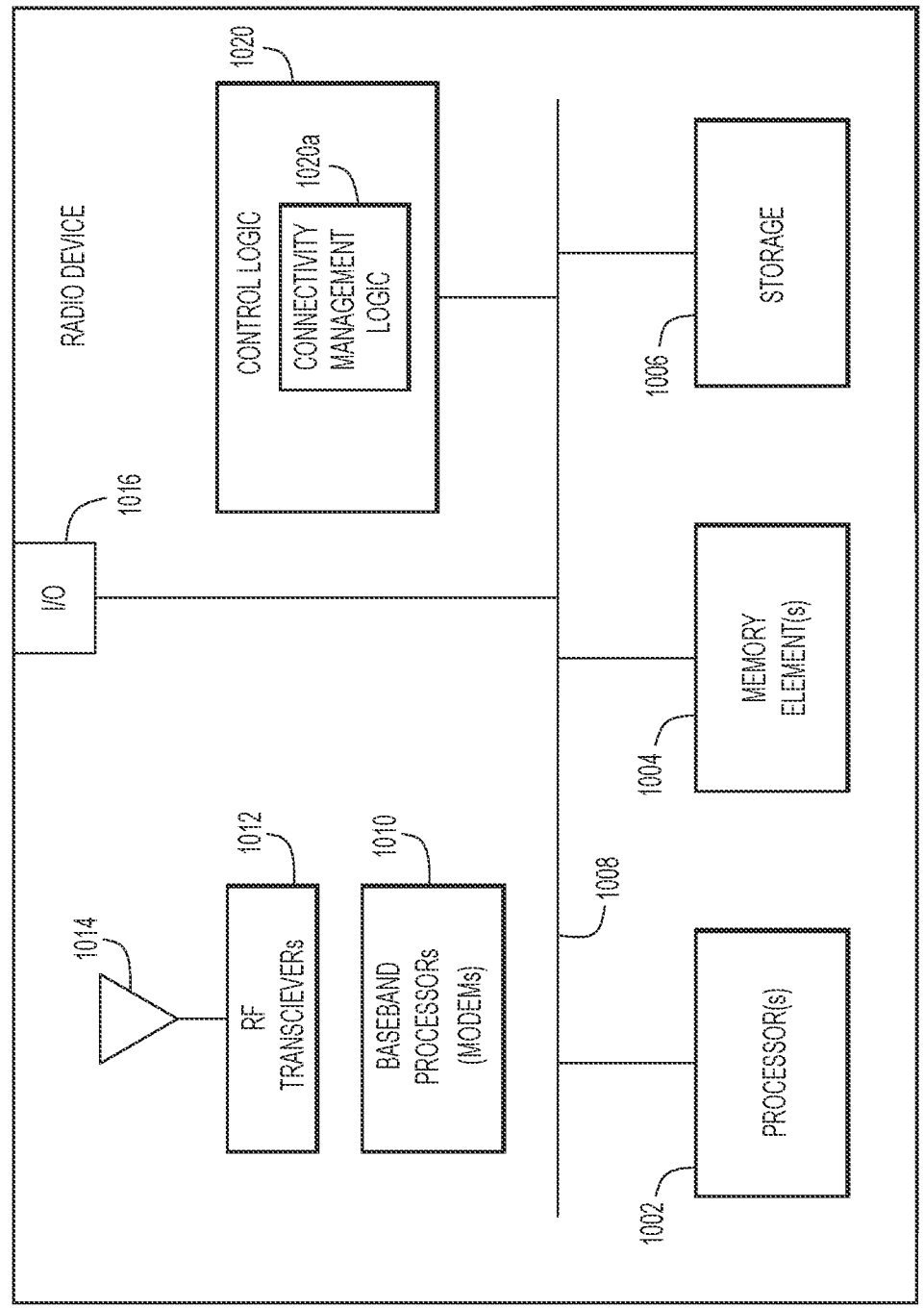
FIG. 10 is a hardware block diagram of a radio device that may perform functions associated with any combination of operations, in connection with the techniques discussed herein.

Referring to FIG. 10, FIG. 10 illustrates a hardware block diagram of a radio device 1000 that may perform functions associated with operations discussed herein. In various embodiments, a radio device or apparatus, such as radio device 1000 or any combination of radio devices 1000, may be configured as any radio node/nodes as depicted herein in order to perform operations of the various techniques discussed herein, such as operations that may be performed by any of an RU (such as any of RUs 131.1-131.4), WLA APs (such as any of WLA APs 141.1-141.5), and/or UEs (such as any of UEs 102.1-102.2).

In at least one embodiment, radio device 1000 may be any apparatus that may include one or more processor(s) 1002, one or more memory element(s) 1004, storage 1006, a bus 1008, baseband processors or modems 1010, radio RF transceivers 1012, one or more antennas or antenna arrays 1014, one or more I/O interface(s) 1016, and control logic 1020. For embodiments in which radio device 1000 may be implemented as a UE, control logic 1020 may further be configured to include connectivity management logic 1020a, which can be enhanced to perform steering operations to steer the UE to a corresponding RAT type and/or radio node(s) (RU(s) or WLA AP(s)) with which the UE can connect for one or more activated steering events communicated to the UE or to deactivate one or more steering events previously activated for the UE, as discussed herein.

The one or more processor(s) 1002, one or more memory element(s) 1004, storage 1006, bus 1008, and I/O interface(s) 1016 may be configured/implemented in any manner described herein, such as described herein at least with reference to FIG. 9.

The RF transceivers 1012 may perform RF transmission and RF reception of wireless signals via antenna(s)/antenna array(s) 1014 for WWA and WLA transmissions/receptions, and the baseband processors (modems) 1010 perform baseband modulation and demodulation, etc. associated with such signals to enable wireless communications for radio device 1000 for WWA and WLA communications.

In various embodiments, control logic 1020, can include instructions that, when executed, cause processor(s) 1002 to perform operations, which can include, but not be limited to, providing overall control operations of radio device 1000; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920/1020, path aware steering logic 112/920a, AMF steering logic 125/920b, WLC steering logic 143/920c, and connectivity management logic 1020a) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904/1004 and/or storage 906/1006 can store data, software, code, instructions (e.g., processor instructions), logic, parameters, combinations thereof, and/or the like used for operations described herein. This includes memory element(s) 904/1004 and/or storage 906/1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining first performance metrics associated with a first plurality of links of a wireless wide area (WWA) virtualized Radio Access Network (vRAN), wherein the first plurality of links include fronthaul links interconnecting at plurality of WWA radio units and at least one distributed unit, midhaul links interconnecting the at least one distributed unit and at least one central unit, and one or more backhaul links interconnecting the at least one central unit and a mobile core network; obtaining second performance metrics associated with a second plurality of links for a wireless local area (WLA) Radio Access Network (RAN), wherein the second plurality of links include a plurality of links between a plurality of WLA radio nodes and a controller of the WLA RAN; and in response to determining that one of the WWA vRAN is experiencing degraded performance based on the first performance metrics or the WLA RAN the second performance metrics, activating a steering event that causes, at least in part, an indication to be communicated to a user equipment (UE) to cause the UE to connect to the WWA vRAN or the WLA RAN that is not experiencing degraded performance.

The first performance metrics can include link utilization for the first plurality of links, packet loss for the first plurality of links, and load for the plurality of WWA radio units, the at least one distributed unit, and the at least one central unit and the second performance metrics can include link utilization for the second plurality of links, packet loss for the second plurality of links, and load for the plurality of WLA radio nodes and the controller of the WLA RAN.

In one instance, determining that one of the WWA vRAN or the WLA RAN is experiencing degraded performance includes determining one of: that one or more of the first performance metrics satisfies one or more threshold levels to determine that the WWA vRAN is experiencing degraded performance; or that one or more of the second performance metrics satisfies one or more threshold levels to determine that the WLA RAN is experiencing degraded performance.

In one instance, upon determining that one or more of the first performance metrics satisfies the one or more threshold levels to determine that the WWA vRAN is experiencing degraded performance, the method includes determining that there is available capacity in the WLA RAN before activating the steering event.

In one instance, based on determining that the WWA vRAN is experiencing degraded performance and that there is available capacity in the WLA RAN, upon obtaining a request from the UE to register with the mobile core network, the activated steering event is associated with providing a Non-Access Stratum (NAS) registration reject message to the UE including the indication to cause the UE to connect to the WLA RAN.

In one instance, the indication communicated to the UE identifies at least one of: that there is available capacity in the WLA RAN; that the WWA vRAN is experiencing degraded performance for at least one of: the fronthaul links, the midhaul links, and the backhaul links; and a list of one or more of the plurality of WLA radio nodes of the WLA RAN with which the UE can connect. In one instance, based on determining that the WWA vRAN is experiencing degraded performance and that there is available capacity in the WLA RAN, the activated steering event is associated with providing, via at least one WWA radio unit, a broadcast including the indication to cause the UE to connect to the WLA RAN, wherein the indication identifies at least one of: that there is available capacity in the WLA RAN; and that the WWA vRAN is experiencing degraded performance for at least one of: the fronthaul links, the midhaul links, and the backhaul links.

In one instance, based on determining that the WWA vRAN is experiencing degraded performance and that there is available capacity in the WLA RAN, upon obtaining a request to establish a quality of service flow for the UE, the activated steering event is associated with providing a Non-Access Stratum (NAS) protocol data unit (PDU) session establishment reject message to the UE including the indication to cause the UE to connect to the WLA RAN.

In one instance, the indication communicated to the UE identifies at least one of: that there is available capacity in the WLA RAN; that the WWA vRAN is experiencing degraded performance for at least one of: the fronthaul links, the midhaul links, and the backhaul links; and a list of one or more of the plurality of WLA radio nodes of the WLA RAN with which the UE can connect.

In one instance, based on determining that the WWA vRAN is experiencing degraded performance and that there is available capacity in the WLA RAN, the activated steering event is associated with updating an Access Traffic Steering, Switching, and Splitting (ATSSS) policy based on updated WWA vRAN and WLA RAN sharing rules to cause the UE to connect to the WLA RAN. In one instance, upon determining that one or more of the second performance metrics satisfies the one or more threshold levels to determine that the WLA RAN is experiencing degraded performance, the method includes determining that there is available capacity in the WWA vRAN before activating the steering event.

In one instance, based on determining that the WLA RAN is experiencing degraded performance and that there is available capacity in the WWA vRAN, upon obtaining an Wi-Fi association request from the UE, the activated steering event is associated with providing an Wi-Fi association response reject message including the indication to cause the UE to connect to the WWA vRAN, wherein the indication identifies at least one of: that the WLA RAN is experiencing degraded performance; that there is available capacity in the WWA vRAN; and a list of one or more of one or more radio units of the WWA vRAN with which the UE can connect.

In one instance, based on determining that the WLA RAN is experiencing degraded performance and that there is available capacity in the WWA vRAN, the activated steering event is associated with providing, via at least one WLA radio node of the plurality of WLA radio nodes of the WLA RAN, a broadcast including the indication to cause the UE to connect to the WWA access network, wherein the indication identifies at least one of: that the WLA RAN is experiencing degraded performance; and that there is available capacity in the WWA vRAN. In one instance, the indication is provided via a quality of service (QoS) enhanced basic service set (QBSS) Information Element (IE).

In one instance, based on determining that the WLA RAN is experiencing degraded performance and that there is available capacity in the WWA vRAN, upon determining that the UE is attempting to initiate a high bandwidth application, the activated steering event is associated with, providing one of an 802.11 Disassociation Response message, an Action Frame, or a Basic Service Set (BSS) Transition Management (BTM) frame to the UE including the indication, wherein the indication identifies at least one of: that the WLA RAN is experiencing degraded performance; that there is available capacity in the WWA vRAN; and a list of one or more of one or more WWA radio units of the WWA vRAN with which the UE can connect.

In summary, techniques herein may provide a WWA (e.g., 5G) disaggregated vRAN and WLA RAN converge system (e.g., system 100) that can facilitate collecting, sending, etc. fronthaul, midhaul, and backhaul link and individual node/ element KPIs/performance metrics to a vRAN path aware steering function, such as path aware steering logic 112 provided for NMS 110 of FIG. 1A. The vRAN path aware steering function (e.g., path aware steering logic 112) can make steering decisions to activate steering events for the WWA vRAN or the WLA RAN and can also assign target or neighbor WLA APs (for WWA to WLA steering) or RUs (for WLA to WWA steering) to steer to for one or more network locations, which can be identified in steering events activated for the WWA vRAN or the WLA RAN. The target/ neighbor WLA APs or RUs for one or more corresponding network locations can be included in steering notifications/ indications sent to UEs via UE steering metadata included in the notifications/indications.

Steering notifications/indications sent to UEs for can also include an indication of bandwidth pressure on one or more of the fronthaul, midhaul, and/or backhaul links as a reason for steering via UE steering metadata included in the notifications/indications. Steering notifications/indications sent to UEs can also include an indication of available capacity for a preferred access (e.g., WLA for WWA to WLA steering or WWA for WLA to WWA steering) via UE steering metadata included in the notifications/indications.

In various embodiments, steering can be triggered for the WWA vRAN for initial registration/connection for the WWA vRAN, upon initiation of new QoS flows, and/or by adjusting ATSSS flows between the WWA vRAN and the WLA RAN based on disaggregated vRAN link pressure and/or node/element load in the WWA vRAN. In various embodiments, steering can be triggered for the WLA RAN for Wi-Fi association and/or upon application flow detection.

Accordingly, multiple techniques are provided herein to facilitate steering between a 5G (WWA) system and UEs and between a Wi-Fi (WLA) access and UEs.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining first performance metrics associated with a first plurality of links of a wireless wide area (WWA) virtualized Radio Access Network (vRAN), wherein the first plurality of links include fronthaul links interconnecting a plurality of WWA radio units and at least one distributed unit, midhaul links interconnecting the at least one distributed unit and at least one central unit, and one or more backhaul links interconnecting the at least one central unit and a mobile core network;
    obtaining second performance metrics associated with a second plurality of links for a wireless local area (WLA) Radio Access Network (RAN), wherein the second plurality of links include a plurality of links between a plurality of WLA radio nodes and a controller of the WLA RAN; and
    in response to determining that one of the WWA vRAN is experiencing degraded performance based on the first performance metrics or the WLA RAN the second performance metrics, activating a steering event that causes, at least in part, an indication to be communicated to a user equipment (UE) to cause the UE to connect to the WWA vRAN or the WLA RAN that is not experiencing degraded performance.

2. The method of claim 1, wherein the first performance metrics include link utilization for the first plurality of links, packet loss for the first plurality of links, and load for the plurality of WWA radio units, the at least one distributed unit, and the at least one central unit and wherein the second performance metrics include link utilization for the second plurality of links, packet loss for the second plurality of links, and load for the plurality of WLA radio nodes and the controller of the WLA RAN.

3. The method of claim 1, wherein determining that one of the WWA vRAN or the WLA RAN is experiencing degraded performance includes determining one of:
    that one or more of the first performance metrics satisfies one or more threshold levels to determine that the WWA vRAN is experiencing degraded performance; or
    that one or more of the second performance metrics satisfies one or more threshold levels to determine that the WLA RAN is experiencing degraded performance.

4. The method of claim 3, wherein upon determining that one or more of the first performance metrics satisfies the one or more threshold levels to determine that the WWA vRAN is experiencing degraded performance, the method includes determining that there is available capacity in the WLA RAN before activating the steering event.

5. The method of claim 4, wherein based on determining that the WWA vRAN is experiencing degraded performance and that there is available capacity in the WLA RAN, upon obtaining a request from the UE to register with the mobile core network, the activated steering event is associated with providing a Non-Access Stratum (NAS) registration reject message to the UE including the indication to cause the UE to connect to the WLA RAN.

6. The method of claim 5, wherein the indication communicated to the UE identifies at least one of:
    that there is available capacity in the WLA RAN;
    that the WWA vRAN is experiencing degraded performance for at least one of: the fronthaul links, the midhaul links, and the backhaul links; and
    a list of one or more of the plurality of WLA radio nodes of the WLA RAN with which the UE can connect.

7. The method of claim 4, wherein based on determining that the WWA vRAN is experiencing degraded performance and that there is available capacity in the WLA RAN, the activated steering event is associated with providing, via at least one WWA radio unit, a broadcast including the indication to cause the UE to connect to the WLA RAN, wherein the indication identifies at least one of:
    that there is available capacity in the WLA RAN; and
    that the WWA vRAN is experiencing degraded performance for at least one of: the fronthaul links, the midhaul links, and the backhaul links.

8. The method of claim 4, wherein based on determining that the WWA vRAN is experiencing degraded performance and that there is available capacity in the WLA RAN, upon obtaining a request to establish a quality of service flow for the UE, the activated steering event is associated with providing a Non-Access Stratum (NAS) protocol data unit (PDU) session establishment reject message to the UE including the indication to cause the UE to connect to the WLA RAN.

9. The method of claim 8, wherein the indication communicated to the UE identifies at least one of:
    that there is available capacity in the WLA RAN;
    that the WWA vRAN is experiencing degraded performance for at least one of: the fronthaul links, the midhaul links, and the backhaul links; and
    a list of one or more of the plurality of WLA radio nodes of the WLA RAN with which the UE can connect.

10. The method of claim 4, wherein based on determining that the WWA vRAN is experiencing degraded performance and that there is available capacity in the WLA RAN, the activated steering event is associated with updating an Access Traffic Steering, Switching, and Splitting (ATSSS) policy based on updated WWA vRAN and WLA RAN sharing rules to cause the UE to connect to the WLA RAN.

11. The method of claim 3, wherein upon determining that one or more of the second performance metrics satisfies the one or more threshold levels to determine that the WLA RAN is experiencing degraded performance, the method includes determining that there is available capacity in the WWA vRAN before activating the steering event.

12. The method of claim 11, wherein based on determining that the WLA RAN is experiencing degraded performance and that there is available capacity in the WWA vRAN, upon obtaining an Wi-Fi association request from the UE, the activated steering event is associated with providing an Wi-Fi association response reject message including the indication to cause the UE to connect to the WWA vRAN, wherein the indication identifies at least one of:
   that the WLA RAN is experiencing degraded performance;
   that there is available capacity in the WWA vRAN; and
   a list of one or more of one or more radio units of the WWA vRAN with which the UE can connect.

13. The method of claim 11, wherein based on determining that the WLA RAN is experiencing degraded performance and that there is available capacity in the WWA vRAN, the activated steering event is associated with providing, via at least one WLA radio node of the plurality of WLA radio nodes of the WLA RAN, a broadcast including the indication to cause the UE to connect to the WWA vRAN, wherein the indication identifies at least one of:
   that the WLA RAN is experiencing degraded performance; and
   that there is available capacity in the WWA vRAN.

14. The method of claim 13, wherein the indication is provided via a quality of service (QoS) enhanced basic service set (QBSS) Information Element (IE).

15. The method of claim 11, wherein based on determining that the WLA RAN is experiencing degraded performance and that there is available capacity in the WWA vRAN, upon determining that the UE is attempting to initiate a high bandwidth application, the activated steering event is associated with, providing one of an 802.11 Disassociation Response message, an Action Frame, or a Basic Service Set (BSS) Transition Management (BTM) frame to the UE including the indication, wherein the indication identifies at least one of:
   that the WLA RAN is experiencing degraded performance;
   that there is available capacity in the WWA vRAN; and
   a list of one or more of one or more WWA radio units of the WWA vRAN with which the UE can connect.

16. One or more non-transitory computer readable storage media encoded with instructions that, when executed by a processor, cause the processor to perform operations, comprising:
   obtaining first performance metrics associated with a first plurality of links of a wireless wide area (WWA) virtualized Radio Access Network (vRAN), wherein the first plurality of links include fronthaul links interconnecting a plurality of WWA radio units and at least one distributed unit, midhaul links interconnecting the at least one distributed unit and at least one central unit, and one or more backhaul links interconnecting the at least one central unit and a mobile core network;
   obtaining second performance metrics associated with a second plurality of links for a wireless local area (WLA) Radio Access Network (RAN), wherein the second plurality of links include a plurality of links between a plurality of WLA radio nodes and a controller of the WLA RAN; and
   in response to determining that one of the WWA vRAN is experiencing degraded performance based on the first performance metrics or the WLA RAN the second performance metrics, activating a steering event that causes, at least in part, an indication to be communicated to a user equipment (UE) to cause the UE to connect to the WWA vRAN or the WLA RAN that is not experiencing degraded performance.

17. The media of claim 16, wherein the first performance metrics include link utilization for the first plurality of links, packet loss for the first plurality of links, and load for the plurality of WWA radio units, the at least one distributed unit, and the at least one central unit and wherein the second performance metrics include link utilization for the second plurality of links, packet loss for the second plurality of links, and load for the plurality of WLA radio nodes and the controller of the WLA RAN.

18. The media of claim 16, wherein determining that one of the WWA vRAN or the WLA RAN is experiencing degraded performance includes determining one of:
   that one or more of the first performance metrics satisfies one or more threshold levels to determine that the WWA vRAN is experiencing degraded performance; or
   that one or more of the second performance metrics satisfies one or more threshold levels to determine that the WLA RAN is experiencing degraded performance.

19. A system comprising:
   at least one memory element for storing data; and
   at least one processor for executing instructions associated with the data, wherein executing the instructions causes the system to perform operations, comprising:
      obtaining first performance metrics associated with a first plurality of links of a wireless wide area (WWA) virtualized Radio Access Network (vRAN), wherein the first plurality of links include fronthaul links interconnecting a plurality of WWA radio units and at least one distributed unit, midhaul links interconnecting the at least one distributed unit and at least one central unit, and one or more backhaul links interconnecting the at least one central unit and a mobile core network;
      obtaining second performance metrics associated with a second plurality of links for a wireless local area (WLA) Radio Access Network (RAN), wherein the second plurality of links include a plurality of links between a plurality of WLA radio nodes and a controller of the WLA RAN; and
      in response to determining that one of the WWA vRAN is experiencing degraded performance based on the first performance metrics or the WLA RAN the second performance metrics, activating a steering event that causes, at least in part, an indication to be communicated to a user equipment (UE) to cause the UE to connect to the WWA vRAN or the WLA RAN that is not experiencing degraded performance.

20. The system of claim 19, wherein the first performance metrics include link utilization for the first plurality of links, packet loss for the first plurality of links, and load for the plurality of WWA radio units, the at least one distributed unit, and the at least one central unit and wherein the second performance metrics include link utilization for the second plurality of links, packet loss for the second plurality of links, and load for the plurality of WLA radio nodes and the controller of the WLA RAN.

\* \* \* \* \*